US012771698B2

(12) United States Patent
Nash et al.

(10) Patent No.: US 12,771,698 B2
(45) Date of Patent: Oct. 20, 2026

(54) REAL-TIME STREAMING EVENT ENRICHMENT FOR SECURITY ENDPOINTS

(71) Applicant: CrowdStrike, Inc., Sunnyvale, CA (US)

(72) Inventors: Brent Ryan Nash, Ladera Ranch, CA (US); James Robert Plush, Lake Forest, CA (US); Matthew Rowen, Milton (GB)

(73) Assignee: CrowdStrike, Inc., Sunnyvale, CA (US)

( * ) Notice: Subject to any disclaimer, the term of this patent is extended or adjusted under 35 U.S.C. 154(b) by 77 days.

(21) Appl. No.: 18/651,379

(22) Filed: Apr. 30, 2024

(65) Prior Publication Data

US 2025/0337757 A1 Oct. 30, 2025

(51) Int. Cl.
*H04L 9/40* (2022.01)
*G06F 11/1446* (2026.01)

(52) U.S. Cl.
CPC ...... *H04L 63/1416* (2013.01); *G06F 11/1464* (2013.01); *H04L 63/1425* (2013.01)

(58) Field of Classification Search
CPC ............. H04L 63/1416; H04L 63/1425; G06F 11/1464
See application file for complete search history.

(56) References Cited

U.S. PATENT DOCUMENTS 8,874,524 B1 * 10/2014 Zhao .................. G06F 11/2071 707/657
9,043,903 B2 5/2015 Diehl et al.
10,108,634 B1 * 10/2018 Pal .......................... H04L 63/20
2015/0348076 A1 * 12/2015 Mondragon .......... G06F 16/215 705/7.34
2018/0365418 A1 * 12/2018 Godowski ............... G06F 21/53
2019/0207981 A1 * 7/2019 Sweeney ............... H04L 41/145
2025/0068641 A1 * 2/2025 Lasky ................... G06F 16/254

FOREIGN PATENT DOCUMENTS

WO WO2022129085 A1 6/2022

OTHER PUBLICATIONS

"Backing Up and Analyzing Data from the System," bmon-documentation.readthedocs.io/en/latest/archiving-and-analyzing-data-from-the-system.html: Accessed Apr. 5, 2024; 3 pages.
"Best Practices linking moving data to its set of meta data." Mar. 2022, <timescale.com/forum/t/best-practices-linking-moving-data-to-its-set-of-meta-data/377>; 5 pages.
"MongoDB performances—how many databases, collections?" Apr. 3, 2018, <stackoverflow.com/questions/49634673/mongodb-performances-how-many-databases-collections>, 3 pages.

* cited by examiner

*Primary Examiner* — Anh Nguyen
(74) *Attorney, Agent, or Firm* — Lee & Hayes, P.C.

(57) ABSTRACT

Hosts of a digital security system receive event data sent by sensors on endpoints that correspond with the hosts. The hosts locally maintain enrichment caches of information regarding the endpoints, and may update the enrichment caches based on information indicated by received event data. The hosts may also generate enriched event data, corresponding to received event data, by adding enrichment data indicated in the enrichment caches that was omitted from the event data sent by sensors.

17 Claims, 5 Drawing Sheets

REAL-TIME STREAMING EVENT ENRICHMENT FOR SECURITY ENDPOINTS

TECHNICAL FIELD

The present disclosure relates to digital security, particularly with respect to enriching event data received by a digital security system with additional information.

BACKGROUND

Digital security exploits that steal or destroy resources, data, and private information on computing devices are an increasing problem. Governments and businesses devote significant resources to preventing intrusions and thefts related to such digital security exploits. Some of the threats posed by security exploits are of such significance that they are described as cyber terrorism or industrial espionage.

Security threats come in many forms, including computer viruses, worms, trojan horses, spyware, keystroke loggers, adware, and rootkits. Such security threats may be delivered in or through a variety of mechanisms, such as spearfish emails, clickable links, documents, executables, or archives. Other types of security threats may be posed by malicious users who gain access to a computer system and attempt to access, modify, or delete information without authorization.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
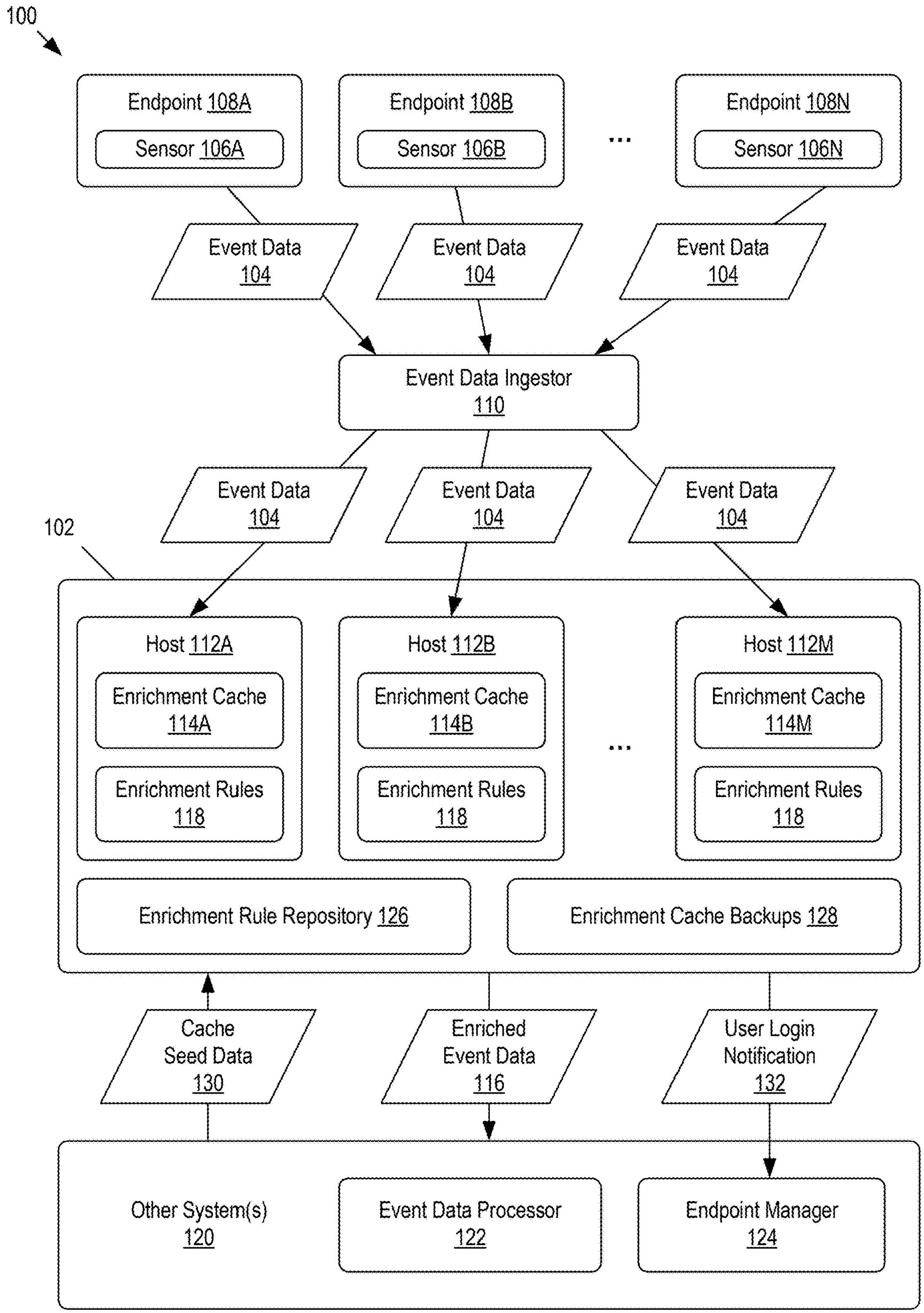
FIG. 1 shows an example of a digital security system that has an enrichment system configured to enrich received event data.

Events that occur on endpoints, such as computers, servers, or other computing systems, may be indicative of security threats to those endpoints. In some examples, an individual event that occurs on an endpoint may indicate that the endpoint is compromised and/or is the target of a security threat. In other examples, individual events that are innocuous on their own may be indicative of a security threat when those events are considered in combination. For instance, opening a file, copying file contents, and opening a network connection to an Internet Protocol (IP) address may each, on their own, be normal and/or routine events on a computing device. However, the particular combination or pattern of those events may indicate that a process executing on the computing device is attempting to steal information from a file and send it to a server.

Digital security systems have accordingly been developed that may observe events that occur on endpoints, and that may use event data about one or more event occurrences to monitor the endpoints and detect and/or analyze security threats. However, it may be a challenge to provide a digital security system with sufficiently-detailed event data that may be used by the digital security system to monitor endpoints and detect and/or analyze security threats.

For example, sensors executing on endpoints may be able to detect occurrence of various types of events. However, due to bandwidth usage concerns and/or other issues, the sensors may be configured to indicate a relatively limited set of information about those events in event data that the sensor send over the Internet and/or other networks to a remote digital security system. Accordingly, although the digital security system may receive event data indicating some information about events that have occurred on endpoints, the relatively limited set of information indicated by the event data sent by the sensors on the endpoints may limit the ability of the digital security system to monitor the endpoints and detect and/or analyze corresponding security threats. For instance, while sensors may send event data that indicates specific information about individual occurrences of events on endpoints, the sensors may be configured to omit names of the endpoints, IP addresses associated with the endpoints, and/or other information about the endpoints that is not directly related to the events from the event data. While omitting such information may reduce the size of the event data sent by the sensors, and thereby reduce bandwidth usage, the omission of such information from event data may limit the ability of the digital security system to use the event data to detect security threats associated with individual endpoints and/or groups of endpoints.

Some digital security systems may track additional information associated with endpoints in a centralized database or other system, such that when the digital security systems process received event data, the digital security systems may retrieve additional information about the endpoints that are associated with the event data. However, it may be difficult and/or resource-intensive to update such a centralized database in real-time or near real-time as event data is received, for instance from thousands or millions of sensors. Having elements of a digital security system query a separately-maintained database for additional information about endpoints may also introduce delays before corresponding instances of event data may be processed, for instance as queries and responses to the queries are transmitted over networks. Moreover, when a large volume of event data is received, it may in some situations not be possible to update a centralized database as quickly as new event data is received. In such situations, some event data may be lost or discarded and/or the centralized database may not be updated based on some event data. Additionally, the centralized database may quickly increase in size due to the large volume of received event data, leading to potential crashes of the centralized database and/or high usage of memory and other computing resources associated with the centralized database.

However, the systems and methods described herein may enrich event data, received from sensors on endpoints, with additional information. Accordingly, the additional information may be directly indicated by the enriched event data, instead of being retrieved over a network from a separate centralized database. For example, although a sensor on an endpoint may be configured to omit broader information about the endpoint from event data the sensor sends to the digital security system, and only include specific details about event occurrences, the digital security system may add broader information about the endpoint to the event data after the event data has been received. As an example, a particular instance of event data received from a sensor on an endpoint may omit an IP address associated with the endpoint, for instance if the IP address was not relevant to the corresponding event. However, the digital security system may maintain an enrichment cache that indicates the IP address associated with the endpoint, based on other previously-received event data that did indicate the IP address. Accordingly, after the digital security system receives the event data instance that omits the IP address of the endpoint, the digital security system may enrich the event data by adding the IP address of the endpoint indicated by the enrichment cache to the event data. After such event data has been enriched with additional information, elements of the digital security system may use the enriched event data to monitor endpoints and detect and/or analyze security threats, based on original information in the event data and/or the additional information added to the enriched event data from the enrichment cache, instead of retrieving the additional information from a separate centralized database.

FIG. 1 shows an example 100 of a digital security system that has an enrichment system 102 that is configured to enrich received event data 104. The digital security system may receive instances of event data 104 from sensors 106 associated with endpoints 108. The sensors 106 may generate and/or output event data 104 indicating information about events that have occurred at corresponding endpoints 108. The sensors 106 may send the event data 104 to the digital security system, for instance via the Internet and/or other networks. An event data ingestor 110 of the digital security system may cause individual instances of event data 104 to be routed to hosts 112 in the enrichment system 102 that correspond with the sensors 106 that sent the event data 104. Each of the hosts 112 in the enrichment system 102 may locally maintain a distinct enrichment cache 114 that stores information about a set of sensors 106, and/or corresponding endpoints 108, that is uniquely associated with that host 112. The hosts 112 may generate instances of enriched event data 116, based on instances of received event data 104, by using enrichment rules 118 to add enrichment data indicated by the respective enrichment caches 114 to the received event data 104. The enriched event data 116 may be provided to, and/or accessed by, one or more other systems 120 within the digital security system, instead of or in addition to the original event data 104 provided by the sensors 106.

The endpoints 108 may be physical and/or virtual computing systems. For example, endpoints 108 may be computers, workstations, mobile computing devices, Internet of Things (IoT) devices, servers, cloud computing resources, virtual computing elements such as containers or virtual machines, network elements such as gateways or firewalls, and/or any other type of computing device or computing system.

Each endpoint 108 may execute a sensor 106 that is configured to detect the occurrence of events on the endpoint 108. For example, the sensor 106 may be a security agent that is installed on, and/or executes via, the endpoint 108 and is configured to monitor operations of the endpoint 108, such as operations executed by an operating system and/or applications. An example of such a security agent is described in U.S. patent application Ser. No. 13/492,672, entitled "Kernel-Level Security Agent" and filed on Jun. 8, 2012, which issued as U.S. Pat. No. 9,043,903 on May 26, 2015, and which is hereby incorporated by reference. The sensor 106 may be configured to detect when certain types of events occur on the endpoint 108. The sensor 106 may also be configured to generate corresponding event data 104 indicating information about such events, and to transmit the event data 104 over the Internet and/or other networks to the digital security system.

As shown in FIG. 1, any number of endpoints 108, such as endpoint 108A, endpoint 108B, . . . and endpoint 108N (wherein "N" represents any number greater than zero), may be configured to execute corresponding sensors 106. There may accordingly be any number of sensors 106 that may provide respective sensor data 104 to the digital security system, such as sensor 106A, sensor 106B, . . . and sensor 106N, as shown in FIG. 1.

Different endpoints 108 may respectively execute different sensors 106. For example, as shown in FIG. 1, a first endpoint 108A may execute a first sensor 106A, while a second endpoint 108B may execute a second sensor 106B. Each of the sensors 106 may be uniquely associated with a corresponding sensor identifier, such as an agent identifier (AID) or other identifier. Accordingly, elements of the digital security system may identify sensors 106, event data 104 provided by the sensors 106, and/or the endpoints 108 that execute the sensors 106, based on the sensor identifiers of the sensors 106.

Endpoints 108 and/or corresponding sensors 106 may, in some examples, be associated with corresponding customers of the digital security system. For example, a particular customer of the digital security system may be a company that is associated with a set of endpoints 108 that may include employee workstations, servers, and/or other computing resources used by the company. Customers of the digital security system may be uniquely identified by corresponding customer identifiers (CIDs). Accordingly, while a sensor 106 on a particular endpoint 108 associated with a customer may be identified by a unique AID or other sensor identifier, a set of sensors 106 on multiple endpoints 108 associated with that customer may be associated with the same CID of the customer.

Sensors 106 may output event data 104 indicating information about one or more types of events on endpoints 108 that are detected by the sensors 106. Such events indicated by event data 104 may include events and behaviors associated with software operations on the endpoints 108, such as events associated with Internet Protocol (IP) connections, other network connections, Domain Name System (DNS) requests, operating system functions, file operations, registry changes, process executions, hostname changes, user identifier (userID) changes, username changes, and/or any other type of operation. By way of non-limiting examples, an event indicated by an instance of event data 104 may be that a process opened a file, that a process initiated a DNS request, that a process opened an outbound connection to a certain IP address, that there was an inbound IP connection, that values in an operating system registry were changed, or any other type of event.

In some examples, events indicated by event data 104 may also, or alternatively, be associated with hardware events or behaviors associated with endpoints 108, such as virtual or physical hardware configuration changes or other hardware-based operations. By way of non-limiting examples, an event indicated by an instance of event data 104 may be that a Universal Serial Bus (USB) memory stick or other USB device was inserted or removed, that a network cable was plugged in or unplugged, that a cabinet door or other component of an endpoint 108 was opened or closed, or any other physical or hardware-related event.

Figure 5:
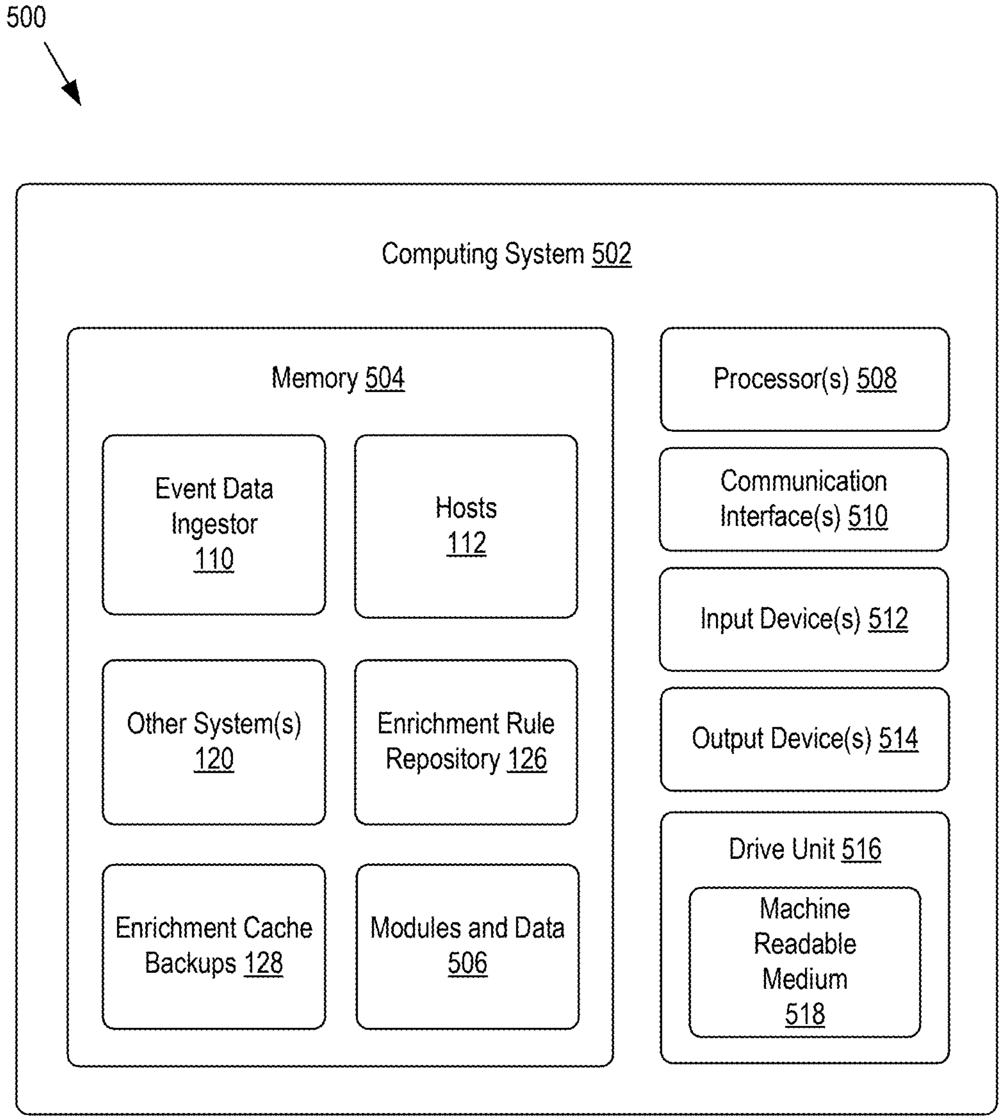
FIG. 5 shows an example system architecture for a computing system associated with the digital security system.

The digital security system may operate remotely from the endpoints 108. For example, the hosts 112 and/or other elements of the enrichment system 102, the event data ingestor 110, the other systems 120, and/or other elements of the digital security system described herein may execute via servers, cloud computing elements, and/or other computing resources that are different from the endpoints 108. FIG. 5, discussed further below, shows an example system architecture for a computing system that may execute one or more hosts 112 and/or other elements of the digital security system.

The enrichment system 102 may be divided into shards, such that different shards are associated with distinct sets of event data 104. The hosts 112 of the enrichment system 102 may be configured to process instances of event data 104 that are associated with respective shards. Each host 112 may be configured to process event data 104 associated with one or more of the shards of the enrichment system 102. Accordingly, different hosts 112 may be configured to process event data 104 associated with different shards. As shown in FIG. 1, the enrichment system 102 may be divided into any number of shards, and there may be number of hosts 112, such as host 112A, host 112B, . . . and host 112M (wherein “M” represents any number greater than zero). In some examples, the number of hosts 112 may be equal to the number of shards. As a non-limiting example, the enrichment system 102 may be divided into 2048 shards, such that there are 2048 different hosts 112. However, in other examples the enrichment system 102 may have any other larger or smaller number of hosts 112 and/or shards. Additionally, in other examples, an individual host 112 may be configured to process event data associated with multiple shards. As a non-limiting example, if there are 2048 shards, there may be 512 different hosts 112, and each of those hosts 112 may be configured to process event data 104 associated with four of the shards. Each shard, and/or the host 112 corresponding to that shard, may have a distinct identifier within the enrichment system 102.

The number of sensors 106 may exceed the number of hosts 112. Accordingly, each individual host 112 may be associated with a distinct set of sensors 106, and thereby be associated with a distinct set of endpoints 108 that execute those sensors 106. For example, each host 112, and/or a respective shard of the enrichment system 102, may be associated with a particular range of sensor identifiers or a particular set of sensor identifiers. Each host 112 may accordingly correspond with a distinct set of sensors 106 that are identified by the sensor identifiers that are associated with that host 112, as well as a distinct set of endpoints 108 that execute those sensors 106. Similarly, each sensor 106, and the endpoint 108 that executes that sensor 106, may be associated with a particular shard and a particular host 112 within the enrichment system 102.

As a non-limiting example, a sensor identifier of the first sensor 106A, executed by the first endpoint 108A, may be associated with host 112A. Accordingly, the first sensor 106A and the first endpoint 108A may be associated with host 112A. A sensor identifier of the second sensor 106B executed by the second endpoint 108B may in some examples also be associated with host 112A, or in other examples may be associated with a different host 112. Accordingly, the second sensor 106B and the second endpoint 108B may be associated with host 112A, or may be associated with a different host 112 that corresponds to the sensor identifier of the second sensor 106B.

The event data ingestor 110 of the digital security system may be configured to sort and/or route individual instances of event data 104 from respective sensors 106 to the particular shards of the enrichment system 102 that are associated with those sensors 106. Accordingly, the hosts 112 that are respectively associated with those shards may process the instances of event data 104 routed to those shards by the event data ingestor 110. For example, the event data ingestor 110 may receive a stream of event data 104 from any number of sensors 106. An individual instance of event data 104 may include or indicate the sensor identifier of the particular sensor 106 that sent that instance of event data 104. The event data ingestor 110 may use the sensor identifier indicated by an individual instance of event data 104 to determine the particular shard that is associated with that sensor identifier, and may route the individual instance of event data 104 to that particular shard within the enrichment system 102. The host 112 associated with the particular shard may then process the instance of event data 104. Accordingly, although the event data ingestor 110 may receive a large stream of event data 104 from numerous sensors 106, the event data ingestor 110 may sort the large stream of event data 104 into shards, such that the hosts 112 associated with those shards receive distinct smaller streams of event data 104 that respectively indicate information about events that occurred on the specific sets of endpoints 108 that correspond to those hosts 112.

As discussed above, the event data ingestor 110 may determine which shard is associated with a particular instance of event data 104 based on an AID or other sensor identifier of the sensor 106 that sent the particular instance of event data 104. In some examples, the event data ingestor 110 may perform a modulo operation to divide an AID value, associated with the instance of event data 104, by the number of shards in the enrichment system 102, find the remainder of the division, and find a shard with an identifier that matches the remainder. As a non-limiting example, if there are 2048 shards in the enrichment system 102, and a remainder of a modulo operation on the AID of a sending sensor 106 is “60,” the event data ingestor 110 may determine that the sending sensor 106 is associated with a shard that has an identifier of “60.” The event data ingestor 110 may route the instance of the event data 104 into a shard that has the identifier of “60.” Accordingly, the host 112 that is configured to process event data 104 associated with the shard having the identifier of “60” may process the instance of the event data 104 as described herein, for instance to enrich that instance of event data 104 by adding additional information and thereby generating a corresponding instance of enriched event data 116.

The event data ingestor 110 may also, or alternately, use a consistent hashing ring to determine which shard is associated with an instance of event data 104, as a fallback or alternate option to the modulo operation discussed above. For instance, if the number of shards in the enrichment system 102 is changed from a fixed number, for instance because additional shards have been created within the enrichment system 102, the modulo operation performed on a sensor identifier value as discussed above may generate a different remainder, and thus may no longer correspond with an identifier of the shard associated with the sensor 106 that sent the instance of event data 104. However, even if the number of shards changes, consistent hashing may be used to identify shards associated with particular sensors 106.

Because the event data ingestor 110 may route instances of event data 104 into corresponding shards, and thereby cause the hosts 112 associated with those shards to receive event data 104 from a distinct set of sensors 106 that is specifically associated with that host 112, an individual host 112 may locally store and maintain an enrichment cache 114 that indicates information about that set of sensors 106 and/or the endpoints 108 that execute that set of sensors 106. Each host 112 may locally store and maintain a distinct enrichment cache 114 that includes different information about respective different sets of sensors 106 and/or endpoints 108. As shown in FIG. 1, there may accordingly be any number of different enrichment caches 114 in the enrichment system 102, such as enrichment cache 114A, enrichment cache 114B, . . . and enrichment cache 114M, that are stored and maintained locally by respective hosts 112. For example, if there are 2048 hosts 112 in the enrichment system 102, there may be 2048 distinct enrichment caches 114 that are respectively maintained by those 2048 hosts 112.

A host 112 may process an instance of event data 104 received from a particular sensor 106 by using the distinct enrichment cache 114 locally stored at the host 112 to determine enrichment data to add to the instance of event data 104. For example, the host 112 may determine that one or more types of enrichment data, indicated in the enrichment cache 114 maintained by the host 112, is absent from the instance of event data 104 sent by the particular sensor 106. The host 112 may add that enrichment data from the enrichment cache 114 to a copy of the original instance of event data 104, to generate a corresponding instance of enriched event data 116. The instance of enriched event data 116 may accordingly include enrichment data added by the host 112, in addition to information indicated by the original instance of event data 104 sent by the sensor 106.

An instance of event data 104 sent by a sensor 106 may contain a relatively limited set of information about an event that occurred on a corresponding endpoint 108. For example, when the sensor 106 detects the occurrence of an event on the endpoint 108, the sensor 106 may be configured to generate an instance of event data 104 that identifies the sensor identifier of the sensor 106 as well as information about the event, such as a type of the event, a time when the event occurred, indications of data changed by the event, a userID associated with a user that was logged in to the endpoint 108 when the event occurred, and/or other information. However, to minimize the size of the instance of event data 104, the sensor 106 may be configured to omit other information, such as general information about the endpoint 108, information that has not changed since the occurrence of previous events, information that is not relevant to the specific occurrence of the event associated with the instance of event data 104, and/or other types of data.

Sensors 106 may be configured to omit some types of information from instances of event data 104 in order to minimize sizes of the instances of event data 104 that are sent via one or more networks to the digital security system. For instance, unless an IP address associated with an endpoint 108, a type of the endpoint 108, or a medium access control (MAC) address or other physical address associated with the endpoint 108 was changed due to a particular event, a sensor 106 on that endpoint 108 may avoid noting the endpoint's IP address, type, and physical address in event data 104 about the particular event.

Similarly, sensors 106 may be configured to omit some or all text strings from event data 104, unless those text strings were generated or modified in association with the corresponding events or are otherwise relevant to the corresponding events, because text strings may be relatively large in size and may tend to increase the overall size of the event data 104. As an example, a first event on an endpoint 108 may change a username used by a user who is associated with a particular userID. Accordingly, the sensor 106 on the endpoint 108 may send first event data 104 about the first event that indicates the text string of the new username that is now associated with the particular userID. However, if a later second event on the endpoint 108 is associated with the same userID, but did not change the corresponding username, the sensor 106 on the endpoint 108 may send second event data 104 about the second event that indicates the userID but omits the text string of the corresponding username that has not changed.

By omitting some types of information from event data 104 in some situations, the overall size of event data 104 sent by sensors 106 individually and in the aggregate may be reduced, and thereby reduce usage of network bandwidth and other computing resources associated with transmission of the event data 104 to the digital security system. For example, a particular customer of the digital security system may be associated with hundreds or thousands of endpoints 108. Accordingly, reducing the size of the event data 104 sent by the sensors 106 on each of these numerous endpoints 108 may reduce overall usage of bandwidth on the customer's network.

However, although the sensors 106 may omit some types of information from event data 104 sent to the digital security system, some elements of the digital security system may be configured to evaluate events based at least in part on types of information that may be omitted from event data 104 sent by sensors 106. The hosts 112 of the enrichment system 102 may accordingly process received event data 104 to generate corresponding enriched event data 116, which may include additional information beyond original information indicated by the original event data 104. Other elements of the digital security system, such as one or more other systems 120, may accordingly access and/or use the enriched event data 116 instead of, or in addition to, the original event data 104.

As an example, the other systems 120 may include an event data processor 122 that is configured to identify individual events and/or combinations of events that may be indicative of digital security threats. The event data processor 122 may, for example, determine whether events associated with one or more IP addresses are indicative of a security threat to one or more endpoints 108. As noted above, information such as IP addresses of endpoints 108 may be omitted from some instances of event data 104 sent by sensors 106. However, if IP addresses of endpoints 108 are omitted from event data 104 provided by sensors 106 on those endpoints 108, corresponding hosts 112 in the enrichment system 102 may add the IP addresses of the endpoints 108 in enriched event data 116 that corresponds to the original event data 104. Accordingly, the event data processor 122 may use the added IP address information in the enriched event data 116 to identify activity on one or more endpoints 108 that may be indicative of security threats, for instance by correlating different events that are associated with the same IP address.

As another example, the one or more other systems 120 may include an endpoint manager 124 that tracks information associated with individual endpoints 108 and/or the sensors 106 executing on those endpoints 108. For example, the endpoint manager 124 may have a table, database, or other repository that indicates the sensor identifiers of sensors 106 on individual endpoints 108, the names of individual endpoints 108, types of individual endpoints 108, sets of usernames associated with individual endpoints 108, indications of users who were most recently logged-in to individual endpoints 108, and/or other information. Based on such information, the endpoint manager 124 may be able to configure the sensors 106 on individual endpoints 108, send messages to particular users or customers associated with individual endpoints 108, and/or perform other operations associated with individual endpoints 108. The endpoint manager 124 may use enriched event data 116, instead of or in addition to original event data 104, to update information about individual endpoints 108 that is tracked by the endpoint manager 124.

As discussed above, hosts 112 in the enrichment system 102 may use distinct locally-stored enrichment caches 114, associated with corresponding distinct sets of sensors 106, to generate enriched event data 116 based on received event data 104. The enrichment cache 114 may indicate previously-determined information about sensors 106 and/or endpoints 108, such as information indicated by previously-received event data 104. For example, the distinct enrichment caches 114 maintained by each host 112 may store, in association with sensor identifiers of sensors 106 on the endpoints 108 that correspond to each host 112, information such as names of the endpoints 108, types of the endpoints 108, IP addresses associated with the endpoints 108, physical addresses of the endpoints 108, usernames that map to userIDs associated with the endpoints 108, identities of the last users that logged in to the endpoints 108, and/or any other information. Accordingly, if an instance of event data 104 received from a sensor 106 on an endpoint 108 omits any of the previously-determined information indicated by the enrichment cache 114 maintained by the corresponding host 112, the host 112 may add the information indicated by the enrichment cache 114 to a corresponding instance of enriched event data 116.

As a non-limiting example, sensor 106A on endpoint 108A may correspond, in the enrichment system 102, with host 112A. Host 112A may maintain enrichment cache 114A that stores information about a distinct set of sensors 106 and endpoints 108 that includes sensor 106A and endpoint 108A. Enrichment cache 114A may indicate a previously-determined name of endpoint 108A, such as a computer name, hostname, or other name associated with endpoint 108A. Enrichment cache 114A may also, or alternately, indicate a previously-determined type of endpoint 108A, such as an indicator of whether endpoint 108A is a workstation, a server, a network element, a container, a virtual machine, or other type of endpoint. Enrichment cache 114A may also, or alternately, indicate one or more previously-determined IP addresses used by endpoint 108A. Enrichment cache 114A may also, or alternately, indicate one or more previously-determined physical addresses used by endpoint 108A. Enrichment cache 114A may also, or alternately, indicate previously-determined mappings of userIDs associated with endpoint 108A to corresponding usernames.

In this example, an instance of event data 104 sent by sensor 106A in association with an occurrence of an event on endpoint 108A may indicate the sensor identifier of sensor 106A, a userID of a user associated with the event, and/or other information about the event. However, the instance of event data 104 sent by sensor 106A may omit one or more of the name of endpoint 108A, the type of endpoint 108A, an IP address of endpoint 108A, a physical address of endpoint 108A, or a username associated with the indicated userID, for instance if those types of information were not changed during the event or are otherwise not directly relevant to the specific occurrence of the event. However, because that omitted information may be stored in the enrichment cache 114A locally maintained by the host 112A, the host 112A may retrieve the information from the enrichment cache 114A and add the information to an instance of enriched event data 116 that corresponds to the instance of event data 104 originally provided by sensor 106A.

In addition to using the enrichment caches 114 to generate enriched event data 116 based on received event data 104, the hosts 112 may also use received event data 104 to update the enrichment caches 114. For example, an enrichment cache 114 maintained by a host 112 may store a known set of IP addresses used by an endpoint 108. If an instance of newly-received event data 104 indicates that a corresponding event has caused the endpoint 108 to begin using a new IP address or otherwise identifies a new IP address being used by the endpoint 108, the host 112 may update the locally-stored enrichment cache 114 to indicate the new IP address that is associated with the endpoint 108. As another example, the enrichment cache 114 maintained by the host 112 may store mappings between usernames and userIDs associated with an endpoint 108. If an instance of newly-received event data 104 indicates that a corresponding event on that endpoint 108 has changed the username that is associated with a particular userID or otherwise indicates a new username associated with the particular userID, the host 112 may update the locally-stored enrichment cache 114 to indicate the new username that is now associated with the particular userID.

Accordingly, after hosts 112 update respective enrichment caches 114 based on new information indicated by event data 104, the hosts 112 may use the updated information in the enrichment cache 114 to generate enriched event data 116 based on subsequently-received event data 104. For example, first event data 104 received by a host 112 at first time may indicate a new username that corresponds to a userID associated with a particular endpoint 108 that is associated with the host 112. The host 112 may use the first event data 104 to update its enrichment cache 114 to indicate the new username that corresponds to the userID. Second event data 104 received by the host 112 at a later second time may indicate the userID associated with the particular endpoint 108, but may omit a username associated with that userID. However, if the host 112 determines that the username associated with the userID is absent from the second event data 104, the host 112 may use the updated information in the locally-stored enrichment cache 114 to determine the username that corresponds to the userID. The host 112 may also generate enriched event data 116 that corresponds to the second event data 104 and that indicates both the userID and the corresponding username.

The hosts 112 may locally store respective enrichment caches 114 in memory and/or other data storage elements at the hosts 112, such that the hosts 112 may directly access and/or modify information in the enrichment caches 114 in real-time or within a threshold period of time. The enrichment caches 114 may be in-memory caches, databases, and/or other repositories of information. In some examples, an enrichment cache associated with a host 112 may be an in-memory cache stored in local memory of the host 112. In other examples, an enrichment cache 114 associated with a host 112 may be a database stored on a disk that locally accessible by the host 112. In still other examples, an enrichment cache associated with a host 112 may include information stored in local memory of the host 112, as well as additional information stored in a disk that is locally accessible by the host 112.

Accordingly, although some types of information about sensors 106 and/or endpoints 108 may also be stored elsewhere in the digital security system, such as at the endpoint manager 124, in data processed by the event data processor 122 or determinations made by the event data processor 122, and/or at other one or more other systems 120, the hosts 112 may access information within the enrichment caches 114 that are locally maintained by the hosts 112 instead of accessing that information from separate one or more other systems 120. For example, when a host 112 receives event data 104 that omits an IP address of an endpoint 108, the host 112 may determine the IP address of the endpoint 108 based on the enrichment cache 114 stored locally at the host 112. Determining the IP address of the endpoint 108 based on the enrichment cache 114 stored locally at the host 112 may be performed substantially in real-time, and may be faster than the host 112 making an application programming interface (API) call over a network to request the IP address of the endpoint 108 from one of the other systems 120 and waiting for the other system 120 to return the requested IP address over the network.

Use of the enrichment caches 114, stored and maintained locally at the hosts 112, to determine enrichment data to be added to received event data 104 may accordingly allow the host 112 to generate corresponding enriched event data 116 in real-time or near real-time as the event data 104 is received, and avoid delays that may otherwise be caused by attempting to retrieve such enrichment data from other systems that are separate and different from the hosts 112. Additionally, because the individual enrichment caches 114 associated with each individual host 112 may also be associated with distinct sets of endpoints 108 and sensors 106, the individual enrichment caches 114 may each use fewer memory resources, and/or be implemented using fewer processing resources and/or other computing resources, than a centralized database of enrichment data for all endpoints 108 and sensors 106 that may be maintained apart from the hosts 112.

As discussed above, information associated with a single endpoint 108 may be stored in a single enrichment cache 114 maintained by a single host 112 in the enrichment system 102. The enrichment caches 114 respectively maintained by different hosts 112 may include information about different distinct sets of endpoints 108. Accordingly, each host 112 may use a respective locally-stored enrichment cache 114 to generate enriched event data 116 associated with its respective set of endpoints 108 in real time or near real-time when corresponding event data 104 is received, without transmitting queries over networks to other systems 120 or to other separate elements of the digital security system.

The hosts 112 may be configured to use enrichment rules 118 to determine which types of enrichment data to add, from respective enrichment caches 114, to enriched event data 116. For instance, enrichment rules 118 may indicate which data types and/or data fields of enrichment data to add to enriched event data 116 based on the enrichment caches 114, if such data is not already included in corresponding event data 104. As a non-limiting example, the enrichment rules 118 may indicate that data fields for a name of an endpoint 108, a type of the endpoint 108, one or more IP addresses of the endpoint 108, one or more physical addresses of the endpoint 108, mappings of usernames to userIDs associated with the endpoint 108, and/or other information should be included in enriched event data 116. Accordingly, if any of those data fields are not present and/or are not filled with values in received event data 104, hosts 112 may use information stored in the enrichment caches 114 to add such data fields and/or values to corresponding enriched event data 116.

In some examples, the enrichment rules 118 may indicate when or if hosts 112 should not generate enriched event data 116 that corresponds to received event data 104. As an example, the enrichment rules 118 may include a block list indicating that enriched event data 116 should not be generated based on instances of event data 104 that correspond to particular customers or customer identifiers included in the block list. As another example, the enrichment rules 118 may indicate that enriched event data 116 should not be generated based on certain types of event data 104 identified by the enrichment rules 118, such as event data 104 from sensors 106 that indicate diagnostic information about the sensors 106 instead of information about other events observed by the sensors 106.

The enrichment rules 118 may also, or alternately, indicate how the hosts 112 are to update the enrichment caches 114 based on received event data 104. For example, the enrichment rules 118 may indicate that if a new instance of event data 104 indicates a new name of an endpoint 108, a new type of the endpoint 108, a new IP address of the endpoint 108, a new physical address of the endpoint 108, a new mapping of a username to a userID associated with the endpoint 108, and/or other new information, a host 112 should update the enrichment cache 114 maintained by the host 112 based on the new information indicated in the new instance of event data 104. The enrichment rules 118 may also define conditions for such updates.

The enrichment rules 118 may, for example, define conditions indicating whether existing information in an enrichment cache 114 should be overwritten or otherwise modified based on information indicated in a new instance of event data 104. For instance, the enrichment rules 118 may indicate that if a new instance of event data 104 has a timestamp that is later than a timestamp associated with data previously used to update a particular field in the enrichment cache 114, the enrichment cache 114 may be updated based on information indicated in the new instance of event data 104. Such enrichment rules 118 may prevent the enrichment cache 114 from being updated based on event data 104 that have older timestamps, for instance if the host 112 receives event data 104 out of order.

As a non-limiting example, two pieces of event data 104 may indicate that a username associated with a particular userID on a particular endpoint 108 was changed twice within a relatively brief period of time, based on different username change events. Accordingly, if a host 112 receives an instance of event data 104 associated with the second username change event first, the host 112 may update the enrichment cache 114 to indicate the username defined via the second username change event. If an instance of event data 104 associated with the first username change event was delayed, and is received by the host 112 at a later point in time, the host 112 may use timestamp information to determine that the username defined via the first username change event is now outdated due to the later-occurring second username change event, and may accordingly avoid updating the enrichment cache 114 to indicate the older username that was defined via the earlier first username change event.

The enrichment rules 118 may also, for example, indicate which types of event data 104 may be used to identify new information, and/or when or how to update the enrichment caches 114 based on such new information. For instance, some types of events may be more likely than other types of events to indicate the names of endpoints 108. The enrichment rules 118 may accordingly indicate that event data 104 about those particular types of events should be reviewed by hosts 112 for potential changes to names of endpoints 108. As a non-limiting example, if an endpoint 108 is a computer that uses the Windows® operating system, the name of the computer may be indicated by event data 104 for a "sensor online" event that the corresponding sensor 106 is only configured to send upon a reboot of the computer. Accordingly, the enrichment rules 118 may indicate that, for endpoints 108 that are Windows® computers, hosts 112 should use event data 104 for "sensor online" events to determine if the names of those endpoints 108 have changed, and if so update the names of the endpoints 108 indicated in the enrichment caches 114. The enrichment rules 118 may also, or alternately, identify other types of event data 104 that hosts 112 may analyze to detect changes to names of endpoints 108, which the hosts 112 may use to update respective enrichment caches 114.

In some examples, the enrichment system 102 and/or other elements of the digital security system may have an enrichment rule repository 126 that stores current and/or historical versions of the enrichment rules 118. If new or updated enrichment rules 118 are developed, the new or updated enrichment rules 118 may be added to the enrichment rule repository 126. The hosts 112 may be configured to periodically or occasionally check the enrichment rule repository 126 for new or updated enrichment rules 118, and/or such new or updated enrichment rules 118 may be pushed from the enrichment rule repository 126 to the hosts 112. The enrichment rules 118 may be formatted as JavaScript Object Notation (JSON) data or other data that the hosts 112 may load into memory and use substantially immediately, without the hosts 112 being restarted or rebooted. Accordingly, the hosts 112 may begin using new or updated enrichment rules 118 substantially immediately after the hosts 112 receive the new or updated enrichment rules 118 from the enrichment rule repository 126.

In some examples, the hosts 112 may be configured to periodically or occasionally generate enrichment cache backups 128 of their respectively-maintained enrichment caches 114, and to store the enrichment cache backups 128 in a database or other data repository in the enrichment system 102 or another element of the digital security system. For example, the hosts 112 may be configured to generate enrichment cache backups 128 every thirty seconds, every minute, every ten minutes, or at any other regular or irregular basis. If an enrichment cache 114 maintained locally by a host 112 becomes corrupted or otherwise experiences an error, or if the host 112 is restarted such that an in-memory version of the enrichment cache 114 maintained by the host 112 is lost, the host 112 may use a corresponding enrichment cache backup 128 to restore the enrichment cache 114 in memory locally at the host 112.

The enrichment cache backups 128 may be associated with timestamps indicating when the enrichment cache backups 128 were generated, pointers to the last pieces of event data 104 that were processed by corresponding hosts 112 before the enrichment cache backups 128 were generated, and/or other information. If an enrichment cache backup 128 is used to restore a corresponding enrichment cache 114 at a host 112, the host 112 may be configured to re-process instances of event data 104 received between the time that the enrichment cache backup 128 was generated and the time at which the enrichment cache 114 is restored at the host 112. Re-processing such intervening instances of event data 104 may allow the restored enrichment cache 114 to be updated based on the intervening instances of event data 104, and thereby reflect any updates to the enrichment cache 114 that may not have been reflected in the enrichment cache backup 128.

As an example, host 112B may have received first event data 104 at time X, second event data 104 at time Y, and third event data 104 at time Z. Host 112B may have processed the first event data 104 at time X, for instance to generate corresponding first enriched event data 116 that added one or more types of information stored in enrichment cache 114B. Host 112B may also have generated an enrichment cache backup 128 at time X, reflecting a state of the enrichment cache 114B at time X. At later time Y, host 112B may have processed the second event data 104, for instance to generate corresponding second enriched event data 116 that added one or more types of information stored in enrichment cache 114B. At time Y, host 112B may have determined that the second event data 104 indicated a new IP address for endpoint 108B, and may have accordingly updated the enrichment cache 114B at time Y to identify the new IP address associated with endpoint 108B. At later time Z, host 112B may have processed the third event data 104 based on the updated enrichment cache 114B, for instance to generate corresponding third enriched event data 116 that added the new IP address for endpoint 108B that had been added to enrichment cache 114B at time Y.

In this example, the enrichment cache 114B may become corrupted or lost after time Z, before host 112B creates a new enrichment cache backup 128 of enrichment cache 114B that reflects the changes made at time Y. However, host 112B may retrieve the enrichment cache backup 128 of enrichment cache 114B that was made at time X. Host 112B may re-process the second event data 104, such that the version of the enrichment cache 114B restored from the enrichment cache backup 128 made at time X may be updated to include the new IP address for endpoint 108B that was indicated by the second event data 104 received at time Y. Host 112B may also re-process the third event data 104, such that the third event data 104 is re-processed according to the restored version of the enrichment cache 114B that has now been updated to include the new IP address for endpoint 108B. Accordingly, re-processing the second event data 104 and the third event data 104 may help ensure that the restored version of enrichment cache 114B reflects updated information indicated by intervening event data 104 received after the latest enrichment cache backup 128 of enrichment cache 114B was made.

In some examples, re-processing instances of event data 104 to update an enrichment cache 114 when the enrichment cache 114 is restored from an enrichment cache backup 128 may cause generation of duplicated enriched event data 116. For instance, in the example above in which second event data 104 and third event data 104 is initially processed by host 112B and then is re-processed in association with restoration of enrichment cache 114B, the re-processing of the second event data 104 and the third event data 104 may generate duplicates of enriched event data 116 generated during the initial processing of the second event data 104 and the third event data 104. However, other systems 120 that may receive and/or use the enriched event data 116 may be configured to use de-duplication methods to detect such duplicate enriched event data 116, such that the other systems 120 may avoid using duplicate copies of enriched event data 116.

When a host 112 in the enrichment system 102 is initially instantiated, is restarted, or otherwise begins running, the host 112 may instantiate an empty instance of an enrichment cache 114. However, the host 112 may use cache seed data

130 to fill the enrichment cache 114 with at least some initial information about endpoints 108 and/or sensors 106 that correspond with that host 112. As discussed above, other systems 120, such as the event data processor 122 and/or endpoint manager 124, may track and/or determine some information about endpoints 108. Accordingly, the host 112 may retrieve cache seed data 130 from one or more other systems 120 that indicates such previously-determined information, and use the cache seed data 130 to fill in the enrichment cache 114 maintained by the host 112 such that the host 112 may then use the enrichment cache 114 to generate enriched event data 116 in real-time without querying other systems 120 for enrichment data.

For instance, a host 112 may be a new element that has newly become associated with a particular endpoint 108 in order to enrich event data received from a sensor 106 on the endpoint 108. However, that particular endpoint 108 may be a previously-existing element, such that the sensor 106 on the endpoint 108 has previously sent instances of event data 104 that have already been processed by the event data processor 122, the endpoint manager 124, and/or other elements of the digital security system. Accordingly, the host 112 may query one or more other systems 120, and/or other elements of the digital security system, for cache seed data 130 associated with the particular endpoint 108 and/or other endpoints 108 that correspond to the host 112. The host may use the cache seed data 130 to pre-fill the enrichment cache 114 maintained locally by the host 112.

As a non-limiting example, endpoint 108A may be a server that has been in use for a year, such that sensor 106A may have been sending event data 104 about events on the server to the digital security system during that year. At the end of that year period, host 112B may be instantiated and become associated with sensor 106A and endpoint 108A, in order for host 112B to begin enriching event data 104 received from sensor 106A. At least some of event data 104 received from endpoint 108A during the past year, already processed by the event data processor 122 and/or other systems 120, may indicate a name of the server, a type of the server, one or more IP addresses used by the server, usernames associated with the server, and/or other information that may be omitted from some instances of event data 104 sent by sensor 106A. Accordingly, one or more other systems 120 may have information that indicates such information determined over the past year that may be used by host 112B as cache seed data 130 associated with endpoint 108A.

In this example, the server may be rebooted relatively infrequently, such that corresponding event data 104 associated with a reboot event that indicates a name of the server may be received by the digital security system relatively infrequently. Instead of an endpoint name field associated with the server in the new enrichment cache 114B being left empty until the next reboot of the server, such that the host 112B would be unable to generate enriched event data 116 indicating the name of the server, the host 112B may determine the last-known name of the server from the cache seed data 130 and indicate that name of the server in the new enrichment cache 114B. Accordingly, the host 112B may be able to generate enriched event data 116 indicating the name of the server even if the server has not been rebooted recently and/or the host 112B itself has not yet received event data 104 indicating the name of the server.

In some examples, hosts 112 may also, or alternately, request and/or receive cache seed data 130 directly from sensors 106. For example, sensors 106 may send messages that identify current names of the corresponding endpoints 108, types of the endpoints 108, IP addresses associated with the endpoints 108, physical addresses of the endpoints 108, mappings of usernames and userIDs associated with the endpoints 108, and/or other types of information. The sensors 106 may send such messages in response to requests from hosts 112, as periodic or occasional heartbeat messages, and/or during other situations as cache seed data 130, specialized event data 104, or other types of messages. For instance, although sensors 106 may be configured to omit some types of information from most instances of event data 104 as described herein, the sensors 106 may be configured to send specialized event data 104 that includes a full set of information about the endpoint 108 once per day, once per week, or on any other schedule, and/or upon request from the hosts 112 or other elements of the digital security system. The hosts 112 may accordingly use full sets of information about endpoints 108 provided by sensors 106 as cache seed data 130 to pre-fill enrichment cache 114.

The hosts 112 may also use cache seed data 130 from other systems 120 and/or the sensors 106 to periodically or occasionally verify that the enrichment caches 114 maintained by the hosts 112 reflect accurate information about endpoints 108. For example, although a host 112 may locally maintain and update an enrichment cache 114, the host 112 may at least occasionally obtain cache seed data 130 from other systems 120 and/or the sensors 106 to determine whether the locally-maintained enrichment cache 114 reflects the same information provided by the other systems 120 and/or the sensors 106. The host 112 may use the cache seed data 130 to correct any errors in the enrichment cache 114. In some examples, the host 112 may use enrichment rules 118 and/or other rules to determine whether existing information in the enrichment cache 114 is accurate relative to cache seed data 130, and/or whether or how to correct any errors in the enrichment cache 114 based on the cache seed data 130.

In some examples, the hosts 112 may track timestamps associated with entries in the enrichment caches 114 that correspond to individual endpoints 108. The hosts may update such timestamps in the enrichment caches 114 when any event data 104 associated with the corresponding endpoints 108 are received by the hosts 112, even if the event data 104 is not used to update the enrichment caches 114. The hosts 112 may be configured to delete entries from the enrichment cache 114 based on the timestamps.

As an example, a timestamp for an entry in an enrichment cache 114 associated with a particular endpoint 108 may indicate that the corresponding host 112 has not received any event data 104 from that particular endpoint 108 for at least a threshold amount of time. Accordingly, the host 112 may be configured to delete the entry for the particular endpoint 108 from the enrichment cache 114. In this example, the particular endpoint 108 may have been a container or other virtual resource that was briefly spun up to perform one or more actions, but that was then destroyed and is no longer in existence such that a sensor 106 associated with the particular endpoint 108 has not sent any event data 104 for at least the threshold amount of time. Because the endpoint 108 no longer exists in this example, the entry in the enrichment cache 114 may be unlikely to be used to enrich any future event data 104 associated with the endpoint 108, so the entry in the enrichment cache 114 may be deleted.

As another example, a host 112 may use timestamps of entries in the enrichment cache 114 to identify entries that may be deleted, for instance based on a maximum number of entries and/or an overall size of the enrichment cache 114. For example, if a number of entries in the enrichment cache 114 has reached a maximum limit and one or more new entries are to be added, or if the host 112 is running out of memory space and/or disk space to store the enrichment cache 114, the host 112 may identify and delete one or more entries with the oldest timestamps. Accordingly, while the host 112 may maintain entries that have recent timestamps because event data 104 from corresponding endpoints 108 have been received recently, entries for endpoints 108 that have not recently sent event data 104 may be deleted from the enrichment cache 114.

The enrichment rules 118 may indicate conditions for when and/or which types of entries may be deleted from the enrichment caches 114. For example, the enrichment rules 118 may indicate a threshold time period, such that an entry may be deleted from an enrichment cache 114 if no corresponding event data 104 has been received for at least the threshold time period.

In some examples, the enrichment rules 118 for deleting entries from enrichment caches 114 may vary depending on endpoint types and/or other criteria. As an example, entries for "container" endpoint types may have a relatively short threshold period of time for deletion, because containers may often exist for relatively brief periods of time as discussed above. Accordingly, the enrichment rules 118 may indicate that entries for "container" endpoint types should be deleted from enrichment caches 114 relatively soon after event data 104 stops being received from those types of endpoint 108. However, the enrichment rules 118 may indicate that entries for "employee computer" endpoint types have a longer threshold period of time for deletion, because there may be situations in which an employee does not use his or her computer for a relatively long period of time but then resumes using that computer. For instance, a sensor 106 on an employee's laptop may provide event data 104 during a first period of time, but then the employee may go on vacation or take a sabbatical for a relatively long second period of time during which the sensor 106 on the laptop does not provide any event data 104. Because the sensor 106 on the laptop may be likely to resume sending event data 104 if and/or when the employee returns to work and resumes use of the laptop, the enrichment rules 118 may indicate that entries for "employee computer" endpoint types should be maintained in enrichment cache 114 for a relatively long period of time, even if no event data 104 has recently been received from those endpoints 108.

In some examples, the hosts 112 may be configured to provide the endpoint manager 124 with user login notifications 132 as part of, or in addition to, enriched event data 116. As discussed above, the hosts 112 may receive event data 104 from sensors 106 on endpoints 108, and may update the enrichment cache 114 based on the received event data 104. The enrichment cache 114 maintained by a host 112 may indicate a last logged-in user for each endpoint 108. For example, if the host 112 receives an instance of event data 104 indicating that a user has logged into a particular endpoint 108, the host 112 may update the enrichment cache 114 to identify the username and/or userID of the user who has logged into the particular endpoint 108. The enrichment cache 114 may continue to indicate the username and/or userID of that user as the last logged-in user on the endpoint 108 until subsequent event data 104 is received that indicates that a different user has logged in to the endpoint 108, at which time the host 112 may update the enrichment cache 114 with the username and/or userID of the new last logged-in user on the endpoint 108.

In addition to tracking the last logged-in users associated with endpoints 108 in the enrichment caches 114, the hosts 112 may also provide corresponding user login notifications 132 to the endpoint manager 124. As discussed above, the endpoint manager 124 may track information associated with individual endpoints 108 and/or the sensors 106 executing on those endpoints 108. The endpoint manager 124 may have a user interface that allows administrative users to search for, filter, and/or view information associated with one or more endpoints 108. For example, the endpoint manager 124 may allow a user to view information associated with a set of endpoints 108 associated with a particular customer. The endpoint manager 124 may also allow administrative users to configure the endpoints 108, configure sensors 106 on the endpoints 108, and/or perform other actions associated with endpoints 108 and/or associated sensors 106.

The endpoint manager 124 may use user login notifications 132, from the hosts 112 in the enrichment system 102, to determine the last logged-in users associated with endpoints 108. The endpoint manager 124 may use the user login notifications 132 to add or update information tracked by the endpoint manager 124 about last logged-in users, for instance to indicate the userID and/or username of the last user who logged in to each endpoint 108, indicate the time that the last user logged in to each endpoint 108, and/or other information.

The endpoint manager 124 may provide and/or display information about the last user that logged in to a particular endpoint 108, such as the user's userID and/or username, the time that the user last logged in to the particular endpoint 108, and/or other information. An administrator user may accordingly use the endpoint manager 124 to determine which user last logged in to the particular endpoint 108 and/or determine when that user last logged in to the particular endpoint 108. Based on such information determined via the endpoint manager 124, the administrator user may also send a message to the last known user of the particular endpoint 108, add the last known user of the particular endpoint 108 to a group associated with particular policies implemented by sensors 106 and/or elements of the digital security system, and/or take other actions based on identification of the last user that logged in to the particular endpoint 108.

Accordingly, if event data 104 received by a host 112 indicates that a new user has logged in to a particular endpoint 108, the host 112 may update the enrichment cache 114 to indicate a userID, username, and/or other identifier of that user, the time of the most recent login to the endpoint 108 by that user, and/or other information associated with the login. The host 112 may also output a corresponding user login notification 132 that indicates the userID, username, and/or other identifier of that user, the time of the most recent login to the endpoint 108 by that user, and/or other information associated with the login. The endpoint manager 124 may use the user login notifications 132 to update corresponding information maintained by the endpoint manager 124, such that updated information about the last known logged-in user on the endpoint 108 may be displayed and/or accessed via the endpoint manager 124.

In some examples, a user login notification 132 may be an instance of enriched event data 116, such as enriched event data 116 that indicates the last logged-in user instead of or in addition to other enrichment data and/or original data indicated by original event data 104. In other examples, a user login notification 132 may be a separate type of notification or message that a host 112 outputs, published, or sends instead of or in addition to enriched event data 116, such that the endpoint manager 124 may access the user login notification 132 instead of or in addition to enriched event data 116.

The endpoint manager 124 may, in some examples, be configured to track information about the last human users who have logged in to corresponding endpoints 108, and not to track information about automated logins by software applications or other computer-implemented systems. For example, if a script is executed by a computing system to automatically log into an endpoint 108 to perform one or more actions, the endpoint manager 124 may be configured to not track information about such an automated login. Similarly, if a computer-implemented service logs into an into an endpoint 108 to perform one or more actions, the endpoint manager 124 may be configured to not track information about such an automated login. However, if a human user manually logs into the same endpoint 108 to perform one or more actions, the endpoint manager 124 may be configured to track information about such a manual login by the human user.

Accordingly, in some examples, the hosts 112 may be configured to analyze event data 104 to determine likelihoods that corresponding login events were performed by human users. If a host 112 determines with at least a threshold level of confidence that a login event indicated by an instance of event data 104 was a login by a human user, the host 112 may output a corresponding user login notification 132 that may cause the endpoint manager 124 to update information about the last logged-in user on a corresponding endpoint 108. If the host 112 does not determine with at least the threshold level of confidence that a login event indicated by an instance of event data 104 was a login by a human user, such that it may be relatively likely that the login was an automated login not performed by a human user, the host 112 may determine not to provide a corresponding user login notification 132 to the endpoint manager 124.

Similarly, in some examples, the endpoint manager 124 may be configured to analyze user login notifications 132 from the host 112 to determine likelihoods that corresponding login events were performed by human users. If the endpoint manager 124 determines with at least a threshold level of confidence that a login event indicated by a user login notification 132 was a login by a human user, the endpoint manager 124 may update information about the last logged-in user on a corresponding endpoint 108. If the endpoint manager 124 does not determine with at least the threshold level of confidence that a login event indicated by a user login notification 132 was a login by a human user, such that it may be relatively likely that the login was an automated login not performed by a human user, the endpoint manager 124 may determine not to update information about the last logged-in user on a corresponding endpoint 108.

In some examples, the hosts 112 and/or the endpoint manager 124 may be configured to use defined rules, such enrichment rules 118 or other rules, to determine whether login events were likely to have been associated with human users and should be reflected in last logged-in user information maintained by the endpoint manager 124. For example, such rules may define attributes of event data 104 and/or other information that distinguish manual logins by human users from automated logins by services, scripts, or other computer-implemented elements.

As an example, rules may indicate that a user is not likely to be a human user if event data 104 and/or user login notification 132 indicates that the user logged in to more than a threshold number or threshold percentage of endpoints 108 during a particular period of time. As another example, rules may indicate that a user is not likely to be a human user if the user's username includes certain strings, such as "service" or "svc," that may be indicative of a computer-implemented service or other automated system. As yet another example, rules may indicate that a user is likely to be a human user if there is at least a threshold amount of time between different login events associated with the user on one or more endpoints 108, or if the standard deviation of periods of time between such login events is larger than a threshold value. In some examples, the hosts 112 and/or the endpoint manager 124 may evaluate attributes of a login event against multiple rules, which may have the same or different weights, and generate an aggregate score or other metric indicating a likelihood of whether the login event was associated with a human user. The hosts 112 and/or the endpoint manager 124 may accordingly compare the aggregate score or other metric against a threshold to make a final determination of whether the login event was associated with a human user and should be used to update the last logged-in user information maintained by the endpoint manager 124.

In other examples, the hosts 112 and/or the endpoint manager 124 may be configured to use machine learning models, heuristics techniques, and/or other systems to predict or otherwise determine whether login events were likely to have been associated with human users and should be reflected in last logged-in user information maintained by the endpoint manager 124. For example, the hosts 112 and/or the endpoint manager 124 may be configured to use a machine learning model to predict whether a login event indicated by event data 104 or a corresponding user login notifications 132 was associated with an automated login or a login by a human user. The machine learning model may be based on convolutional neural networks, recurrent neural networks, other types of neural networks, nearest-neighbor algorithms, regression analysis, deep learning algorithms, Gradient Boosted Machines (GBMs), Random Forest algorithms, and/or other types of artificial intelligence or machine learning frameworks.

Such a machine learning model may be trained, via supervised and/or unsupervised machine learning techniques, to determine attributes that may be predictive of whether corresponding login events were performed automatically or by human users. For instance, a training data set may include instances of event data 104 associated with historical login events. The training data set may be labeled to indicate which of the login events were performed by human users, and which were automated login events. The machine learning model may be trained based on the training data set to identify attributes associated with login events that may be indicative of whether the login events were performed by human users, weights associated with such attributes or combinations of attributes, and/or other information. Accordingly, after the machine learning model has been trained on the training data set, the machine learning model may use instances of such predictive attributes and/or corresponding weights to make a prediction for a new login event that indicates whether the new login event was likely to have been performed by a human user or was likely to be an automated login event.

In some examples, the endpoint manager 124 may accept user input indicating whether last logged-in user information provided via the endpoint manager 124 is accurate. For example, if the endpoint manager 124 displays information indicating that a particular user was the last user to log in to an endpoint 108, but an administrative user of the endpoint manager 124 determines that the particular user was an automated system rather than a human user, the administrative user may provide feedback indicating that the last logged-in user information for the endpoint 108 is incorrect. Such feedback may be used as additional labeled training data to train or re-train machine leaning models, heuristic systems, or other systems used by the host 112 and/or the endpoint manager 124 to determine whether login events are likely to be associated with automated logins or logins by human users.

Because the host 112 may provide user login notifications 132 to the endpoint manager 124 based on received event data 104 that indicates when users have logged into corresponding endpoints 108, the endpoint manager 124 may update corresponding last logged-in user information substantially in real-time, or within a threshold time after users have logged into the endpoints 108. Accordingly, the endpoint manager 124 may update the last logged-in user information more quickly than if such last logged-in user information is determined following processing of event information by the event data processor 122 and/or in other ways.

Overall, generation of enriched event data 116 by the hosts 112 of the enrichment system 102 may allow one or more other systems 120, such as the event data processor 122 and/or the endpoint manager 124, to evaluate events that have occurred on endpoints 108 based on both original information sent in event data 104 by sensors 106 on those endpoints 108, and based on additional enrichment data added by the hosts 112 based on enrichment caches 114 maintained by the hosts 112. Accordingly, sensors 106 may omit some types of data from event data 104 in many situations, for instance to reduce the size of the event data 104 and reduce corresponding bandwidth usage, because the omitted information and/or other additional information may be added to corresponding enriched event data 116 by the hosts 112 after the event data 104 has been received by the digital security system.

Although the enrichment system 102 described herein may generate enriched event data 116 that corresponds to event data 104 received from sensors 106 that execute on sensors 106, the enrichment system 102 may also, or alternately, generate enriched event data 116 that corresponds to other types of event data 104 that are not received from sensors 106 and/or are received from sensors 106 that are associated with multiple endpoints 108. For example, endpoints 108 may include services and/or other elements of a cloud computing system. In some examples, distinct cloud computing elements may individually execute sensors 106 as discussed above. However, in other examples, the cloud computing system may provide the digital security system with event data 104 indicating events that have occurred within the cloud computing system, monitoring systems may evaluate cloud computing logs to identify such events and generate and/or provide corresponding event data 104, and/or other systems may identify and/or provide event data 104 associated with one or more endpoints 108. Such systems may be considered to be sensors 106 that correspond to the individual endpoints 108, and/or event data 104 may identify corresponding endpoints 108 without being directly associated with particular sensors 106. In these examples, the event data ingestor 110 may route event data 104 into shards of the enrichment system 102 based on which endpoints 108 are associated with the event data 104, such that the hosts 112 associated with those endpoints 108 may update respective enrichment caches 114 and use the respective enrichment caches 114 to generate corresponding enriched event data 116.

Figure 2:
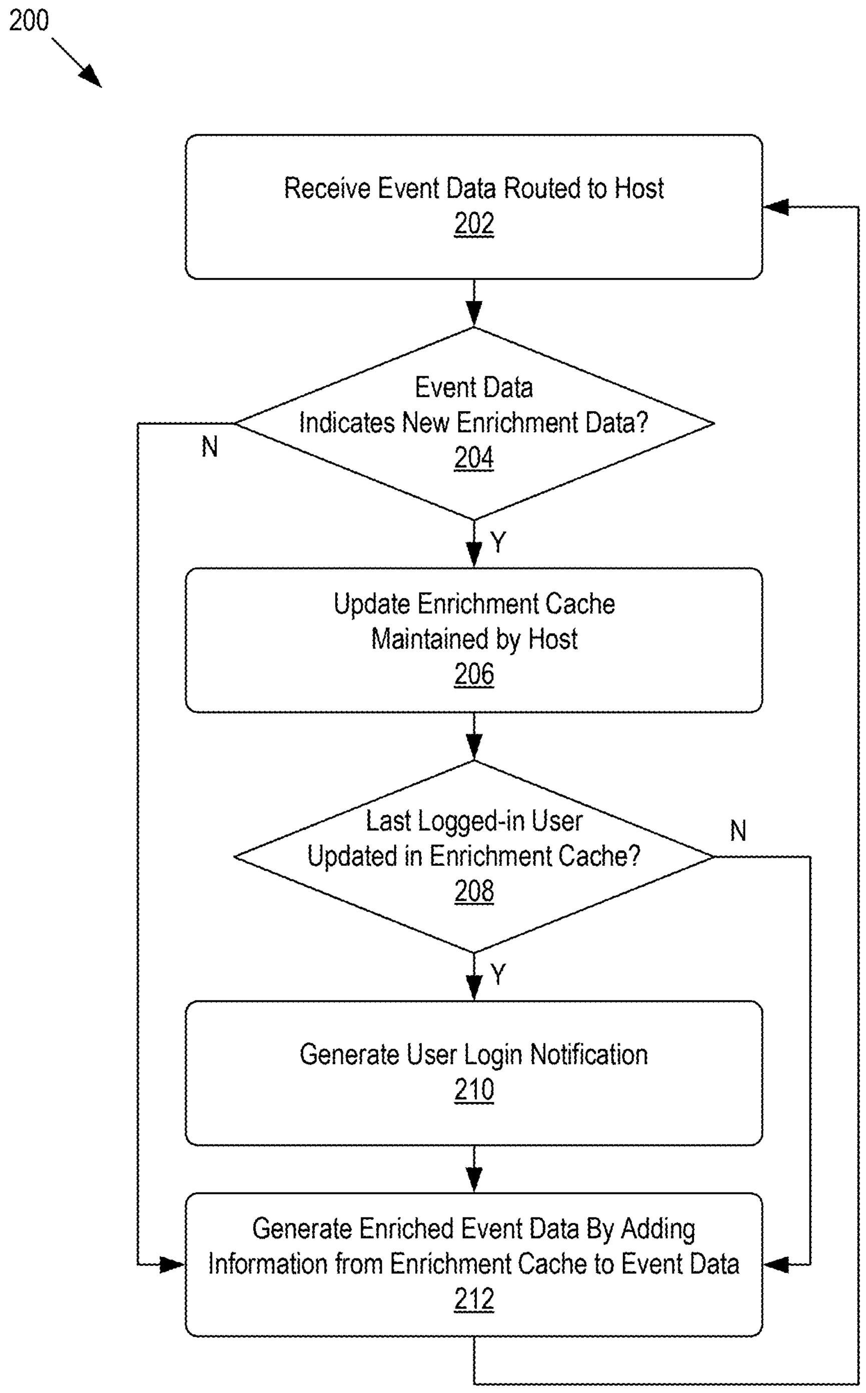
FIG. 2 shows a flowchart of an example process for processing received event data by the digital security system.

FIG. 2 shows a flowchart of an example process 200 for processing received event data 104 by the digital security system. The example process 200 shown in FIG. 2 may be performed by a host 112 within the enrichment system 102, which may be executed by a computing system. For example, the computing system shown and described with respect to FIG. 5 may execute the host 112 that performs the example process 200.

At block 202, the host 112 may receive an instance of event data 104 that has been routed to the host 112. The host 112 may be associated with a distinct set of endpoints 108 and/or sensors 106, and may be associated with one or more corresponding shards in the enrichment system 102. Other hosts 112 in the enrichment system 102 may be associated with different sets of endpoints 108 and/or sensors 106, and/or other shards. Sensors 106 associated with numerous endpoints 108 may provide event data 104 to the digital security system. The event data ingestor 110 of the digital security system may determine which of the shards of the enrichment system 102 is associated with each individual instance of event data 104 that is received by the digital security system, for instance based on identifiers of the sensors 106 and/or the endpoints 108 that sent each individual instance of event data 104. Accordingly, at block 202 the host 112 may receive an instance of event data 104 that the event data ingestor 110 has determined was sent by a sensor 106 on an endpoint 108 that is uniquely associated with a shard that corresponds to the host 112.

At block 204, the host 112 may determine whether the instance of event data 104 received at block 202 indicates any new enrichment data that is not yet reflected in the enrichment cache 114 locally maintained by the host 112. The host 112 may locally maintain the enrichment cache 114 in memory, on disk, and/or via other data storage systems associated with the host 112, such that the host 112 may access and/or change the enrichment cache 114 directly without communicating with other systems via networks. The enrichment cache 114 maintained by the host 112 may indicate enrichment data associated with the distinct set of sensors 106 and/or endpoints 108 that corresponds to the host 112, such that the enrichment cache 114 maintained by the host 112 may include different information than other enrichment caches 114 that are maintained by other hosts 112 that correspond with different sets of sensors 106 and/or endpoints 108.

The enrichment cache 114 maintained by the enrichment cache 114 may, based on information previously received by the host 112, indicate values of one or more enrichment data types associated with the distinct set of sensors 106 and/or endpoints 108 that corresponds to the host 112. For example, the enrichment cache 114 may indicate names of the endpoints 108, types of the endpoints 108, IP addresses associated with the endpoints 108, physical addresses of the endpoints 108, usernames that map to userIDs associated with the endpoints 108, identities of the last users that logged in to the endpoints 108, and/or any other information. Accordingly, at block 204 the host 112 may determine whether the instance of event data 104 received at block 202 indicates any enrichment data, about the sensor 106 and/or endpoint 108 that sent the instance of event data 104, that is not already indicated in the enrichment cache 114 maintained by the host 112.

If the instance of event data 104 does indicate new enrichment data (Block 204—Yes), the host 112 may use that enrichment data at block 206 to update the enrichment cache 114 maintained by the host 112. For example, if the event data 104 indicates a new value of a particular enrichment data type, the host 112 may overwrite a previous value of the particular enrichment data type in the enrichment cache 114, may add the new value to the enrichment cache 114 but maintain one or more older historical values of the particular enrichment data type in the enrichment cache 114, or may append the new value to a collection of other values for the particular enrichment data type in the enrichment cache 114. In some examples, the host 112 may use enrichment rules 118 to determine which types of enrichment data to maintain in the enrichment cache 114, to determine which types of event data 104 to evaluate for potential updates to corresponding types of enrichment data in the enrichment cache 114, and/or to otherwise determine how to update the enrichment cache 114 based on received event data 104.

At block 208, the host 112 may determine whether a value for a last logged-in user of an endpoint 108 was updated in the enrichment cache 114 at block 206. For example, if the instance of event data 104 received at block 202 was associated with an event indicating that a user associated with a particular userID and/or username logged into an endpoint 108, but the enrichment cache 114 indicates that a different user associated with different userID and/or username had last logged in to that endpoint 108, the host 112 may have updated last logged-in user information associated with the endpoint 108 in the enrichment cache 114 at block 206.

If the last logged-in user of an endpoint 108 was updated in the enrichment cache 114 based on the received instance of event data 104 (Block 208—Yes), at block 210 the host 112 may generate and/or output a corresponding user login notification 132 that identifies the new last logged-in user associated with the endpoint 108. For example, the user login notification 132 may identify the userID and/or username of the new last logged-in user associated with the endpoint 108. The endpoint manager 124 in the digital security system may use the user login notification 132 to update information separately-stored by the endpoint manager 124 about the last known user to have logged in the endpoint 108, for instance so that the endpoint manager 124 may display that information and/or provide that information to administrative users of the endpoint manager 124.

In some examples, the host 112 may use rules, heuristics, machine learning models, and/or other systems to determine a likelihood that a user login event was associated with a login by a human user and not an automated login by a script, service, or other computer-implemented system. In these examples, the host 112 may be configured to update the enrichment cache 114 to indicate a new last logged-in user at block 206, and/or output a corresponding user login notification 132 at block 210, if the likelihood that the user login event was associated with a login by a human user exceeds a threshold value. Accordingly, if it is not likely that a login event was associated with a human user, the host 112 may avoid updating the enrichment cache 114 to indicate a new last logged-in user at block 206, and/or may avoid outputting a corresponding user login notification 132 at block 210.

In other examples, the host 112 may be configured to update the enrichment cache 114 and output a corresponding user login notification 132 based on any user login event. In these examples, the endpoint manager 124 may be configured to use rules, heuristics, machine learning models, and/or other systems to determine whether a user login event associated with an endpoint 108, indicated by a user login notification 132, was likely associated with a login by a human user and not an automated login by a script, service, or other computer-implemented system, and accordingly whether the endpoint manager 124 should update its separately-stored information regarding the last known user to have logged in the endpoint 108.

If the instance of event data 104 received at block 202 did not indicate any new enrichment data that could be used to update the enrichment cache 114 (Block 204—No), the host 112 may generate a corresponding instance of enriched event data 116 at block 212. If instead the host 112 does update the enrichment cache 114 based on new enrichment data indicated by the instance of event data 104 at block 206, the host 112 may generate a corresponding instance of enriched event data 116 at block 212 based on the updated enrichment cache 114.

At block 212, the host 112 may generate the instance of enriched event data 116 by copying the instance of event data 104 received at block 202, and by adding any additional enrichment data from a corresponding entry in the enrichment cache 114 that was not already indicated by the instance of event data 104 received at block 202. The host 112 may determine that one or more types of enrichment data, indicated by the enrichment cache 114, are absent from the instance of event data 104, and may accordingly add that enrichment data to the corresponding instance of enriched event data 116. As an example, if the instance of event data 104 received at block 202 omitted a name of the endpoint 108 that sent the instance of event data 104, but the enrichment cache 114 indicates a previously-determined name of that endpoint 108, the host 112 may add the name of the endpoint 108 to the corresponding instance of enriched event data 116 generated at block 212. The host 112 may output the instance of enriched event data 116 generated at block 212 such that one or more one or more other systems 120 may use the enriched event data 116 instead of, or in addition to, the originally-received event data 104. For example, the event data processor 122 may use the enrichment data added to enriched event data 116, instead of or in addition to original information present in corresponding event data 104 sent by sensors 106 on endpoints 108, to monitor those endpoints 108 and/or to detect or analyze security threats.

In some examples, the host 112 may generate the instance of enriched event data 116 at block 212 after the host 112 generates a user login notification 132 at block 210, or after the host determines that the logged-in user of an endpoint 108 was not updated in the enrichment cache 114 (Block 208—No). In other examples, the host 112 may determine whether or not to generate a user login notification 132 after generation of the enriched event data 116 at block, or at any other time. In still other examples, the host 112 may be configured to avoid generating a separate user login notification 132 at block 210 based on a user login event, but may include the user login notification 132 or corresponding information in the enriched event data 116 generated at block 212 such that the endpoint manager 124 may obtain information about the user login event based on the enriched event data 116.

After generating an instance of enriched event data 116 at block 212 that corresponds to an instance of event data 104 received at block 202, the host 112 may return to block 202 to receive another instance of event data 104. The host 112 may accordingly repeat process 200 to process that instance of event data 104, and generate a corresponding instance of enriched event data 116. The host 112 may thus use the process 200 to process and enrich multiple instances of event data 104 that are received by the host 112 over time. The host 112 may process each individual instance of event data 104 in sequence using operations of process 200, or may perform the same or different operations of process 200 in parallel or at substantially the same time with respect to different instances of event data 104.

Figure 3:
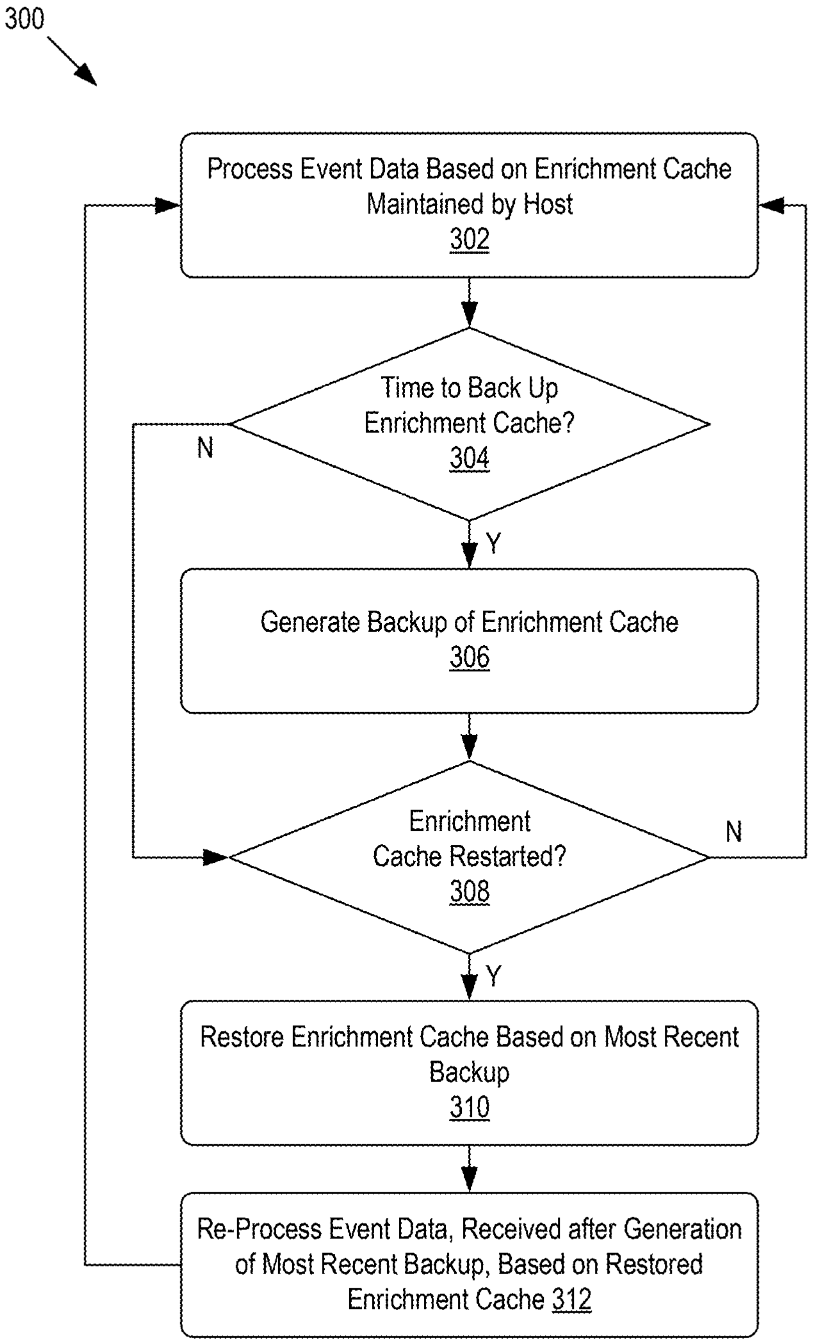
FIG. 3 shows a flowchart of an example process for restoring an enrichment cache maintained by a host of the enrichment system.

FIG. 3 shows a flowchart of an example process 300 for restoring an enrichment cache 114 maintained by a host 112. The example process 300 shown in FIG. 3 may be performed by a host 112 within the enrichment system 102, which may be executed by a computing system. For example, the computing system shown and described with respect to FIG. 5 may execute the host 112 that performs the example process 300.

At block 302, the host 112 may process one or more instances of event data 104 received by the digital security system that were sent by sensors 106 on endpoints 108 that correspond to the host 112, for instance as discussed above with respect to the example process 200 shown in FIG. 2. For example, the host 112 may update an enrichment cache 114 locally maintained by the host 112 based on received instances of event data event data 104, and/or may add enrichment data indicated by the enrichment cache 114 to instances of enriched event data 116 generated by the host 112.

At block 304, the host 112 may determine whether it is time to back up the enrichment cache 114 maintained by the host 112. As an example, the host 112 may be configured to generate an enrichment cache backup 128 of the enrichment cache 114 every 30 seconds, every minute, every hour, or on any other regular or irregular schedule. As another example, the host 112 may be configured to generate a new enrichment cache backup 128 of the enrichment cache 114 after processing every N pieces of event data 104, after processing M byes of event data 104, and/or upon the occurrence of any other defined condition for generating an enrichment cache backup 128. If it is time to back up the enrichment cache 114 (Block 304—Yes), the host 112 may copy the enrichment cache 114 to generate a new corresponding enrichment cache backup 128 at block 306, and may store the generated enrichment cache backup 128 at a database or repository in the enrichment system 102 or another element of the digital security system.

After backing up the enrichment cache 114 at block 306, or if it is not currently time to generate a backup of the enrichment cache 114 (Block 304—No), the host 112 may determine at block 308 whether the enrichment cache 114 associated with the host 112 is being restarted. For example, if the host 112 crashes and is restarted, the host 112 may restart the enrichment cache 114 by instantiating a fresh version of the enrichment cache 114 that is initially empty. Similarly, if the enrichment cache 114 becomes corrupted, the host 112 may restart the enrichment cache 114 by instantiating a fresh version of the enrichment cache 114 that is initially empty.

If the enrichment cache 114 is not being restarted (Block 308—No), the host 112 may return to block 302 to continue processing received event data 104 based on the enrichment cache 114 maintained by the host 112. However, if the enrichment cache 114 is being restarted (Block 308—Yes), the host 112 may restore the enrichment cache 114 based on the most recent enrichment cache backup 128 of the enrichment cache 114 that was made at block 306. For example, if the host 112 is configured to generate a new enrichment cache backup 128 every minute, and the last enrichment cache backup 128 was made thirty seconds before the enrichment cache 114 was restarted, the host 112 may fill in the restarted version of the enrichment cache 114 with values indicated by that last enrichment cache backup 128.

However, because the host 112 may have processed some event data 104 at block 302 since the last enrichment cache backup 128 was made at block 306, last enrichment cache backup 128 made at block 306 may not reflect any updates to the enrichment cache 114 that were made based on the event data 104 processed by the host 112 after the last enrichment cache backup 128 was made. Accordingly, the version of the enrichment cache 114 that was restored at block 310 based on the latest enrichment cache backup 128 may also not reflect updates that had made based on the event data 104 processed by the host 112 after the latest enrichment cache backup 128 was made.

However, at block 312 the host 112 may re-process instances of event data 104 that were received after the last enrichment cache backup 128 was made, based on the enrichment cache 114 restored at block 310. For example, the host 112 may update the restored enrichment cache 114 based on event data 104 that was received after the last enrichment cache backup 128 was made, and/or may use such updates to determine enrichment data to add to enriched event data 116 that corresponds to event data 104 that was received after the last enrichment cache backup 128 was made. Accordingly, by re-processing event data 104 that were received after the last enrichment cache backup 128 was made, the restored enrichment cache 114 may be brought up to date.

After re-processing instances of event data 104 at block 312 in order to bring the restored enrichment cache 114 up to date, the host 112 may return to block 302 to process received event data 104 based on the restored enrichment cache 114. For instance, the host 112 may further update the restored enrichment cache 114 based on new enrichment data indicated by any subsequently-received instances of event data 104.

Figure 4:
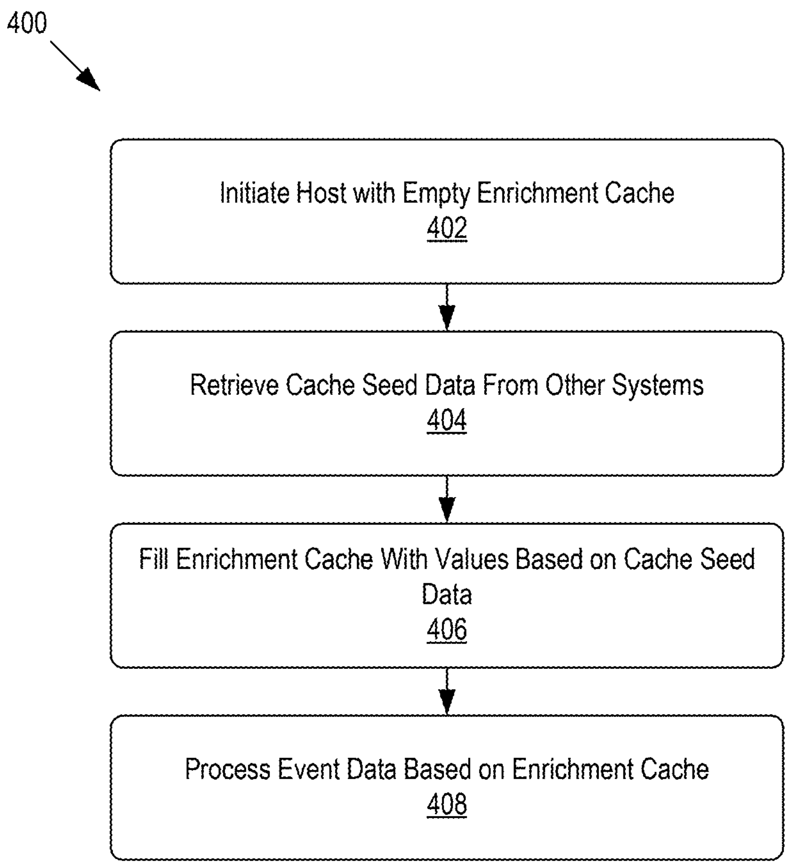
FIG. 4 shows a flowchart of an example process for initially instantiating an enrichment cache maintained by a host of the enrichment system.

FIG. 4 shows a flowchart of an example process 400 for initially instantiating an enrichment cache 114 maintained by a host 112. The example process 400 shown in FIG. 4 may be performed by a host 112 within the enrichment system 102, which may be executed by a computing system. For example, the computing system shown and described with respect to FIG. 5 may execute the host 112 that performs the example process 400.

At block 402, the host 112 may be initiated with a corresponding enrichment cache 114 that is initially empty. As an example, the enrichment system 102 may be a new system that is brought online after deployment of sensors 106 on endpoints 108. Those sensors 106 may previously have been sending event data 104 to the digital security system, before hosts 112 in the enrichment system 102 were configured to enrich that event data 104 or maintain enrichment cache 114. Accordingly, when the host 112 is initiated, the host 112 may not yet have generated an enrichment cache backup 128 with previously-determined information about endpoints 108 that the host 112 could use to fill the new enrichment cache 114. Similarly, if the host 112 is a new host that has been spun up to process event data 104 associated with a new set of endpoints 108, the new host 112 may not yet have generated an enrichment cache backup 128 with previously-determined information about those endpoints 108 that the host 112 could use to fill the new enrichment cache 114.

At block 404, the host 112 may retrieve cache seed data 130 from one or more other systems 120 in the digital security system, such as the event data processor 122, the endpoint manager 124, and/or other types of systems. The host 112 may retrieve cache seed data 130 associated with a distinct set of sensors 106 and/or endpoints 108 that corresponds with that host 112. The cache seed data 130 may indicate information about those sensors 106 and/or endpoints 108, such as information previously determined by the event data processor 122, the endpoint manager 124, and/or other types of systems. For example, the event data processor 122 may have previously determined information about particular endpoints 108 by processing instances of event data 104 that were received from sensors 106 on those particular endpoints 108 before the host 112 was initiated. Similarly, the endpoint manager 124 may maintain separate information about the endpoints 108 and/or corresponding sensors 106, for instance based on how the endpoint manager 124 has configured those endpoints 108.

In some examples, the host 112 may also, or alternately, obtain cache seed data 130 from the sensors 106. For example, the host 112 may requesting cache seed data 130 from the sensors 106, and/or may receive heartbeat messages or other information from the sensors 106 that may indicate full sets of enrichment data about those sensors 106 that may be omitted from some or most event data 104.

At block 406, the host 112 may use the cache seed data 130 to fill in values of the enrichment cache 114 initiated at block 402. For example, the cache seed data 130 may indicate previously-determined values associated with endpoints 108. Accordingly, the host 112 may use such values indicated by the cache seed data 130 as enrichment data, and may fill in entries in the enrichment cache 114 based on those values.

After initializing the enrichment cache 114 based on the cache seed data 130, the host 112 may begin processing newly-received instances of event data 104 based on the enrichment cache 114 at block 408. For example, the host 112 may use the example process 200 discussed above with respect to FIG. 2 to further update the enrichment cache 114 based on new enrichment data indicated by newly-received instances of event data 104, and/or to generate enriched event data 116 based on the enrichment cache 114. The host 112 may also begin generating enrichment cache backups 128 of the enrichment cache 114, such that the host 112 may use the example process 300 discussed above with respect to FIG. 3 to recover the enrichment cache 114 from an enrichment cache backup 128 in some situations.

Although the host 112 may initially use cache seed data 130 received via a network from other sources to pre-fill the enrichment cache 114 with values, the host 112 may thereafter use the filled enrichment cache 114 maintained locally at the host 112 to process event data 104 without retrieving values from other sources. For instance, the host 112 may update the enrichment cache 114 maintained locally at the host 112 based on new enrichment data indicated by subsequent instances of event data 104, and/or may use enrichment data indicated by the enrichment cache 114 maintained locally at the host 112 to generate enriched event data 116 that the host 112 provides to one or more other systems 120.

FIG. 5 shows an example system architecture 500 for a computing system 502 associated with the digital security system described herein. The computing system 502 may include one or more servers, computers, or other types of computing device that may execute one or more elements of the digital security system, such as the event data ingestor 110, the hosts 112 and/or other elements of the enrichment system 102, one or more other systems 120, and/or other elements.

Individual computing devices of the computing system 502 may have the system architecture 500 shown in FIG. 5, or a similar system architecture. In some examples, endpoints 108 may also have an architecture similar to the system architecture 500 shown in FIG. 5.

The computing system 502 may, in some examples, include or be part of a cloud computing environment or other distributed system that hosts and/or executes one or more elements associated with the digital security system. For example, the computing system 502 may execute virtual machines, cloud instances, and/or other elements associated with one or more elements of the digital security system.

Similarly, in some examples, elements associated with the digital security system may be distributed among, and/or be executed by, multiple computing systems or devices similar to the computing system 502 shown in FIG. 5. As an example, different hosts 112 within the enrichment system 102 may be executed by different servers. As another example, the hosts 112 in the enrichment system 102 may be executed by different servers than servers that execute the event data ingestor 110, the event data processor 122, the endpoint manager 124, other systems 120, and/or other elements of the digital security system.

The computing system 502 may include memory 504. In various examples, the memory 504 may include system memory, which may be volatile (such as RAM), non-volatile (such as ROM, flash memory, non-volatile memory express (NVMe), etc.) or some combination of the two. The memory 504 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which may be used to store desired information and which may be accessed by the computing system 502. Any such non-transitory computer-readable media may be part of the computing system 502.

The memory 504 may store data and/or computer-executable instructions, such as data and/or computer-executable instructions associated with software elements. For example, the memory 504 may store data and/or computer-executable instructions associated with elements of the enrichment system 102, such the hosts 112, the enrichment caches 114 respectively maintained by the hosts 112, the enrichment rules 118 used by hosts 112, the enrichment rule repository 126, and/or enrichment cache backups 128. The memory 504 may also, or alternately, store data and/or computer-executable instructions associated with other elements of the digital security system, such as the event data ingestor 110, the event data processor 122, the endpoint manager 124, and/or other systems 120.

The memory 504 may also store other modules and data 506 that may be utilized by the computing system 502 to perform or enable performing any action taken by the computing system 502. For example, the other modules and data 506 may include a platform, operating system, and/or applications, as well as data utilized by the platform, operating system, and/or applications.

The computing system 502 may also have one or more processors 508. In various examples, each of the processors 508 may be a central processing unit (CPU), a graphics processing unit (GPU), both a CPU and a GPU, or any other type of processing unit. Each of the one or more processors 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 508 may also be responsible for executing computer applications stored in the memory 504, which may be associated with types of volatile and/or nonvolatile memory. For example, the processors 508 may access data and computer-executable instructions stored in the memory 504, and execute such computer-executable instructions.

The computing system 502 may also have one or more communication interfaces 510. The communication interfaces 510 may include transceivers, modems, interfaces, antennas, telephone connections, and/or other components that may transmit and/or receive data over networks, telephone lines, or other connections. For example, the communication interfaces 510 may include one or more network cards or other network interfaces that may be used to receive event data 104 from sensors 106.

In some examples, the computing system 502 may also have one or more input devices 512, such as a keyboard, a mouse, a touch-sensitive display, voice input device, etc., and/or one or more output devices 514 such as a display, speakers, a printer, etc. These devices are well known in the art and need not be discussed at length here.

The computing system 502 may also include a drive unit 516 including a machine readable medium 518. The machine readable medium 518 may store one or more sets of instructions, such as software or firmware, that embodies any one or more of the methodologies or functions described herein. The instructions may also reside, completely or at least partially, within the memory 504, processor(s) 508, and/or communication interface(s) 510 during execution thereof by the computing system 502. The memory 504 and the processor(s) 508 also may constitute machine readable media 518.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
- receiving, by a host in a digital security system, event data sent by a sensor executing on a computing endpoint, wherein:
  - the sensor comprises a security agent configured to detect computing events that occur on the computing endpoint,
  - the event data indicates information associated with an occurrence of a computing event, detected by the security agent, on the computing endpoint, and
  - the host maintains an enrichment cache that stores enrichment data, associated with the computing endpoint, determined based at least in part on one or more instances of previous event data that the sensor previously sent to the digital security system;
- determining, by the host, that one or more types of the enrichment data associated with the computing endpoint, indicated by the enrichment cache, are absent from the event data sent by the sensor;
- generating, by the host, enriched event data by adding the one or more types of the enrichment data, from the enrichment cache, to the event data;
- determining, by the host, that the event data indicates new enrichment data associated with the computing endpoint that is not indicated by the enrichment cache maintained by the host; and
- updating, by the host, the enrichment cache maintained by the host to indicate the new enrichment data.

2. The computer-implemented method of claim 1, wherein the enrichment data associated with the computing endpoint, stored in the enrichment cache maintained by the host, indicates at least one of:
- a name of the computing endpoint,
- a type of the computing endpoint,
- an Internet Protocol (IP) address used by the computing endpoint,
- a physical address of the computing endpoint, or
- a mapping of a username to a user identifier associated with the computing endpoint.

3. The computer-implemented method of claim 1, further comprising providing, by the host, the enriched event data to at least one other system in the digital security system.

4. The computer-implemented method of claim 1, further comprising:
- generating, by the host, a backup of the enrichment cache at a first time after the updating of the enrichment cache based on the event data;
- updating, by the host, the enrichment cache at a second time based on new second enrichment data indicated by second event data received from the sensor;
- restoring, by the host, the enrichment cache at a third time based on the backup generated at the first time; and
- re-processing, by the host, the second event data after the third time, wherein re-processing the second event data updates the enrichment cache, restored based on the backup generated at the first time, based on the new second enrichment data indicated by the second event data.

5. The computer-implemented method of claim 1, wherein the enrichment cache is maintained in local memory of the host.

6. The computer-implemented method of claim 1, wherein:
- the host is one of a plurality of hosts of an enrichment system within the digital security system,
- different hosts, of the plurality of hosts, respectively maintain different enrichment caches that correspond to different sets of computing endpoints, and
- the host is, within the plurality of hosts, associated with a set of computing endpoints that includes the computing endpoint.

7. The computer-implemented method of claim 6, wherein:
- the different sets of computing endpoints are respectively associated with different shards, of a plurality of shards, in the digital security system,
- an event data ingestor, of the digital security system, determines that the event data is associated with a particular shard, of the plurality of shards, and routes the event data to the particular shard, and
- the host corresponds to the particular shard.

8. The computer-implemented method of claim 1, further comprising:
- initially instantiating, by the host, the enrichment cache as an empty enrichment cache;

retrieving, by the host, and via a network from at least one source within the digital security system, cache seed data that:

is associated with a set of computing endpoints that corresponds to the host, and indicates pre-determined values of the enrichment data determined based at least in part on the one or more instances of previous event data; and filling, by the host, the enrichment cache with the pre-determined values of the enrichment data, wherein the filling of the enrichment cache, with the pre-determined values of the enrichment data, configures the host to begin generating enriched event data instances based on corresponding event data instances received from sensors executing on the set of computing endpoints.

9. A computing system, comprising:

one or more processors; and memory storing computer-executable instructions associated with a host of a digital security system that, when executed by the one or more processors, cause the host to:

receive event data sent by a sensor executing on a computing endpoint, wherein:

the sensor comprises a security agent configured to detect computing events that occur on the computing endpoint, the event data indicates information associated with an occurrence of a computing event, detected by the security agent, on the computing endpoint, and the host maintains an enrichment cache that stores enrichment data, associated with the computing endpoint, determined based at least in part on one or more instances of previous event data that the sensor previously sent to the digital security system;

determine that one or more types of the enrichment data associated with the computing endpoint, indicated by the enrichment cache, are absent from the event data sent by the sensor;

generate enriched event data by adding the one or more types of the enrichment data, from the enrichment cache, to the event data;

determine that the event data indicates new enrichment data associated with the computing endpoint that is not indicated by the enrichment cache maintained by the host; and update the enrichment cache maintained by the host to indicate the new enrichment data.

10. The computing system of claim 9, wherein the computer-executable instructions further cause the host to provide the enriched event data to at least one other system in the digital security system.

11. The computing system of claim 9, wherein the computer-executable instructions further cause the host to:

generate a backup of the enrichment cache at a first time after updating of the enrichment cache based on the event data;

update the enrichment cache at a second time based on new second enrichment data indicated by second event data received from the sensor;

restore the enrichment cache at a third time based on the backup generated at the first time; and re-process the second event data after the third time, wherein re-processing the second event data updates the enrichment cache, restored based on the backup generated at the first time, based on the new second enrichment data indicated by the second event data.

12. The computing system of claim 9, wherein:

the host is one of a plurality of hosts of an enrichment system within the digital security system, different hosts, of the plurality of hosts, respectively maintain different enrichment caches that correspond to different sets of computing endpoints, the host is, within the plurality of hosts, associated with a set of computing endpoints that includes the computing endpoint, the different sets of computing endpoints are respectively associated with different shards, of a plurality of shards, in the digital security system, an event data ingestor, of the digital security system, determines that the event data is associated with a particular shard, of the plurality of shards, and routes the event data to the particular shard, and the host corresponds to the particular shard.

13. The computing system of claim 9, wherein the computer-executable instructions further cause the host to:

initially instantiate the enrichment cache as an empty enrichment cache;

retrieve via a network from at least one source within the digital security system, cache seed data that:

is associated with a set of computing endpoints that corresponds to the host, and indicates pre-determined values of the enrichment data determined based at least in part on the one or more instances of previous event data; and fill the enrichment cache with the pre-determined values of the enrichment data, wherein filling the enrichment cache, with the pre-determined values of the enrichment data, configures the host to begin generating enriched event data instances based on corresponding event data instances received from sensors executing on the set of computing endpoints.

14. One or more non-transitory computer-readable media storing computer-executable instructions associated with a host of a digital security system that, when executed by one or more processors, cause the host to:

receive event data sent by a sensor executing on a computing endpoint, wherein:

the sensor comprises a security agent configured to detect computing events that occur on the computing endpoint, the event data indicates information associated with an occurrence of a computing event, detected by the security agent, on the computing endpoint, and the host maintains an enrichment cache that stores enrichment data, associated with the computing endpoint, determined based at least in part on one or more instances of previous event data that the sensor previously sent to the digital security system;

determine that one or more types of the enrichment data associated with the computing endpoint, indicated by the enrichment cache, are absent from the event data sent by the sensor;

generate enriched event data by adding the one or more types of the enrichment data, from the enrichment cache, to the event data;

determine that the event data indicates new enrichment data associated with the computing endpoint that is not indicated by the enrichment cache maintained by the host; and update the enrichment cache maintained by the host to indicate the new enrichment data.

15. The one or more non-transitory computer-readable media of claim 14, wherein the computer-executable instructions further cause the host to:

generate a backup of the enrichment cache at a first time after updating of the enrichment cache based on the event data;

update the enrichment cache at a second time based on new second enrichment data indicated by second event data received from the sensor;

restore the enrichment cache at a third time based on the backup generated at the first time; and re-process the second event data after the third time, wherein re-processing the second event data updates the enrichment cache, restored based on the backup generated at the first time, based on the new second enrichment data indicated by the second event data.

16. The one or more non-transitory computer-readable media of claim 14, wherein:

the host is one of a plurality of hosts of an enrichment system within the digital security system, different hosts, of the plurality of hosts, respectively maintain different enrichment caches that correspond to different sets of computing endpoints, the host is, within the plurality of hosts, associated with a set of computing endpoints that includes the computing endpoint, the different sets of computing endpoints are respectively associated with different shards, of a plurality of shards, in the digital security system, an event data ingestor, of the digital security system, determines that the event data is associated with a particular shard, of the plurality of shards, and routes the event data to the particular shard, and the host corresponds to the particular shard.

17. The one or more non-transitory computer-readable media of claim 14, wherein the computer-executable instructions further cause the host to:

initially instantiate the enrichment cache as an empty enrichment cache;

retrieve via a network from at least one source within the digital security system, cache seed data that:

is associated with a set of computing endpoints that corresponds to the host, and indicates pre-determined values of the enrichment data determined based at least in part on the one or more instances of previous event data; and fill the enrichment cache with the pre-determined values of the enrichment data, wherein filling the enrichment cache with the pre-determined values of the enrichment data configures the host to begin generating enriched event data instances based on corresponding event data instances received from sensors executing on the set of computing endpoints.

* * * * *